US012742869B2

(12) United States Patent
Ellappan et al.

(10) Patent No.: US 12,742,869 B2
(45) Date of Patent: Sep. 22, 2026

(54) PROXIMITY MOTION SENSING FOR VIRTUAL REALITY SYSTEMS

(71) Applicant: QUALCOMM Incorporated, San Diego, CA (US)

(72) Inventors: Parthiban Ellappan, Virudhunagar (IN); Xiaoxin Zhang, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 502 days.

(21) Appl. No.: 17/471,469

(22) Filed: Sep. 10, 2021

(65) Prior Publication Data

US 2023/0081452 A1 Mar. 16, 2023

(51) Int. Cl.

*G01S 13/48* (2006.01)
*G01S 13/88* (2006.01)
*G02B 27/01* (2006.01)
*H04W 4/80* (2018.01)

(52) U.S. Cl.

CPC ............ *G01S 13/48* (2013.01); *G01S 13/886* (2013.01); *G02B 27/017* (2013.01); *H04W 4/80* (2018.02)

(58) Field of Classification Search

CPC ..... G01S 13/48; G01S 13/886; G02B 27/017; H04W 4/80

See application file for complete search history.

(56) References Cited

U.S. PATENT DOCUMENTS

2008/0300618 A1* 12/2008 Gertner .................. A61F 5/003 606/192
2012/0207071 A1* 8/2012 Zhu ...................... H04B 7/0452 370/311
2014/0062669 A1* 3/2014 Mena ................ H04W 52/0216 340/10.5
2014/0091811 A1* 4/2014 Potyrailo ........... G06K 19/0717 324/602
2016/0214016 A1* 7/2016 Stafford ................ A63F 13/212
2017/0123747 A1* 5/2017 Rochford .............. G06F 3/1423
2017/0160392 A1* 6/2017 Brisimitzakis ............ G01S 7/24
2018/0174870 A1* 6/2018 Yang ................. H01L 21/67069
2018/0358991 A1* 12/2018 Kwok .................. H01Q 1/1257
2019/0101638 A1* 4/2019 Vu ........................... H04N 5/38

(Continued)

FOREIGN PATENT DOCUMENTS

EP 3133468 A1 2/2017

OTHER PUBLICATIONS

Z. Zhou, C. Wu, Z. Yang and Y. Liu, “Sensorless sensing with WiFi,” in Tsinghua Science and Technology, vol. 20, No. 1, pp. 1-6, Feb. 2015, doi: 10.1109/TST.2015.7040509. (Year: 2015).*

(Continued)

*Primary Examiner* — Brady W Frazier
*Assistant Examiner* — Noah Yi Min Zhu
(74) *Attorney, Agent, or Firm* — Thien T. Nguyen

(57) ABSTRACT

Techniques are provided for alerting a user of a virtual reality (VR) system of hazards in the proximate environment. An example method of proximity sensing with a virtual reality headset includes communicating with a station via a first wireless link, detecting a target object using radio frequency sensing on a second wireless link, determining a rate of approach associated with the target object, and generating an alert based at least in part on the rate of approach.

71 Claims, 17 Drawing Sheets

(56) References Cited

U.S. PATENT DOCUMENTS

| | | | | |
|---|---|---|---|---|
| 2019/0294410 | A1* | 9/2019 | Miyazaki | G06F 3/01 |
| 2021/0177279 | A1* | 6/2021 | Cros | A61B 5/6882 |
| 2021/0312943 | A1* | 10/2021 | Kulkarni | G10L 25/78 |
| 2022/0121292 | A1* | 4/2022 | Lin | G02B 27/0172 |
| 2022/0125299 | A1* | 4/2022 | Abou Shousha | A61B 3/024 |
| 2022/0244371 | A1* | 8/2022 | Park | G01S 7/356 |
| 2022/0299619 | A1* | 9/2022 | Hu | G01S 7/415 |
| 2023/0155663 | A1* | 5/2023 | Li | G01S 13/003<br>342/52 |

OTHER PUBLICATIONS

International Search Report and Written Opinion—PCT/US2022/036340—ISA/EPO—Sep. 30, 2022.
Taiwan Search Report—TW111125882—TIPO—Oct. 12, 2025.

* cited by examiner

PROXIMITY MOTION SENSING FOR VIRTUAL REALITY SYSTEMS

BACKGROUND

Virtual Reality (VR) systems enable users to explore and immerse themselves in virtual environments which may provide computer generated graphical and audio content. Some VR systems utilize a head mounted device (HMD) to immerse a user in the VR environment. A HMD may cover the eyes of the user with one or more display screens and may have headphones to provide audio to the user. Some HMDs may be configured to communicate with a wireless network, and a remote server may be configured to provide the VR content to the HMD. The user may be isolated from a physical environment while wearing the HMD and thus may not be aware of possible dangers associated with changes to the physical environment. There exists a need to monitor the physical environment to provide alerts to the user during an emergency or when changes to the proximate or surrounding physical environment may endanger the user.

SUMMARY

An example method of proximity sensing with a virtual reality headset according to the disclosure includes communicating with a station via a first wireless link, detecting a target object using radio frequency sensing on a second wireless link, determining a rate of approach associated with the target object, and generating an alert based at least in part on the rate of approach.

Implementations of such a method may include one or more of the following features. Generating the alert may include providing an indication of the alert to the station via the first wireless link. The indication of the alert may be embedded in an uplink data frame transmitted to the station. The indication of the alert may be included in a block acknowledgement frame transmitted to the station. Communicating with the station via the second wireless link, such that generating the alert may include providing an indication of the alert to the station via the second wireless link. Increasing a bandwidth of transmissions on the second wireless link for the radio frequency sensing in response to detecting the target object. Increasing a periodicity of transmissions on the second wireless link for the radio frequency sensing in response to detecting the target object. Determining at least one of a velocity of the target object, a size of the target object, or a distance to the target object based on the radio frequency sensing on the second wireless link. Generating the alert may comprise displaying a graphical object based on the at least one of the velocity of the target object, the size of the target object, the distance to the target object, or any combinations thereof. Activating a camera based on the at least one of the velocity of the target object, the size of the target object, the distance to the target object, or any combination thereof. Obtaining an image with the camera and displaying at least part of the image in the virtual reality headset. Generating the alert includes activating one or more components in the virtual reality headset. The radio frequency sensing may be based on radio frequency sensing signals transmitted from the virtual reality headset. The radio frequency sensing may be based on radio frequency sensing signals transmitted from the station. The rate of approach may be based at least in part on the target object moving towards the virtual reality headset. The rate of approach may be based at least in part on the virtual reality headset moving towards the target object. Different alerts may be generated corresponding to different rates of approach.

An example method of providing an alert with a virtual reality headset according to the disclosure includes detecting a target object using radio frequency sensing, determining one or more attributes of the target object based on the radio frequency sensing, and generating the alert based at least in part on the one or more attributes.

Implementations of such a method may include one or more of the following features. The one or more attributes may include at least one of a velocity of the target object, a size of the target object, or a distance to the target object. Displaying a graphical object based on one or more of the velocity of the target object, the size of the target object, the distance to the target object, or any combinations thereof. Activating a camera and obtaining at least one image of the target object based on at least one of the velocity of the target object, the size of the target object, the distance to the target object, or any combinations thereof. Displaying at least part of the at least one image in the virtual reality headset. Determining a classification of the target object based at least in part on the at least one image, and generating the alert based at least in part on the classification of the target object. The alert may include a sound, a haptic response, a displayed text, a displayed graphical object, or any combinations thereof, based on the target object. Increasing a bandwidth of transmissions used for the radio frequency sensing in response to detecting the target object. Increasing a periodicity of transmissions used for the radio frequency sensing in response to detecting the target object. Generating the alert may include activating one or more components in the virtual reality headset. Generating the alert may include providing an indication of the alert to a network station. The radio frequency sensing may utilize a first frequency range, and the virtual reality headset may be configured to communicate with the network station via a second frequency range that is different from the first frequency range. The radio frequency sensing may be based on radio frequency sensing signals transmitted from the virtual reality headset. The radio frequency sensing may be based on radio frequency sensing signals transmitted from an access point. Different alerts may be generated corresponding to different values of the one or more attributes.

An example apparatus according to the disclosure includes a memory, at least one transceiver, at least one processor communicatively coupled to the memory and the at least one transceiver, and configured to communicate with a station via a first wireless link, detect a target object using radio frequency sensing on a second wireless link, determine a rate of approach associated with the target object, and generate an alert based at least in part on the rate of approach.

An example apparatus according to the disclosure includes a memory, at least one transceiver, at least one processor communicatively coupled to the memory and the at least one transceiver, and configured to detect a target object using radio frequency sensing, determine one or more attributes of the target object based on the radio frequency sensing, and generate an alert based at least in part on the one or more attributes.

Items and/or techniques described herein may provide one or more of the following capabilities, as well as other capabilities not mentioned. A virtual reality (VR) system may utilize a head mounted device (HMD) to immerse a user in a VR environment. The HMD may be a multi-link device (MLD) configured to operate on multiple wireless communication links. A first link may be configured for uplink and downlink data exchanges with a network station. The network station may be configured to provide VR environment data to the user. A MLD VR HMD may utilize a second link for radio frequency (RF) sensing with variable bandwidths (BW) and variable pulse frequencies. The second link may also be used for data exchanges with the network station. The VR HMD may also include an external facing camera which may be activated based on RF sensing measurements. In an example, the RF sensing measurements may be configured to determine one or more attributes of a target object, such as a rate of approach, a size, a distance, and/or a classification. The VR HMD may be configured to provide alerts based on the relative rate of approach of the target object (e.g., based on movement of the target object and/or the HMD). The type of alert may be based on the rate of approach as compared to one or more threshold values. The HMD may be configured to alert the user based on providing a camera based image of the object in the VR field of view, or in a picture-in-picture view in the VR head set. The camera on the HMD may be configured to activate based on the rate the target object is approaching or other attributes such as the velocity, distance, and size of the target object. The settings on the RF sensing transmissions may also be dynamic based on the detection of an object. For example, the bandwidth and the pulse frequency may increase after an object is initially detected to increase the resolution and accuracy of the position estimates for the object. The selective use of the camera and the variable RF sensing transmission may be configured to reduce power consumption and prolong battery discharge time. The VR system may be configured to send an emergency signal to the network station to interrupt, pause, or stop the VR application completely. The emergency signal may be included in an uplink frame, and/or in an acknowledgement frame sent by the VR system. Uplink data frames and/or uplink acknowledgment frames may be used to indicate an emergency. The VR application may display or sound an emergency alert to enable the user to remove the VR device and take appropriate action. Other capabilities may be provided and not every implementation according to the disclosure must provide any, let alone all, of the capabilities discussed.

DETAILED DESCRIPTION

Figure 1:
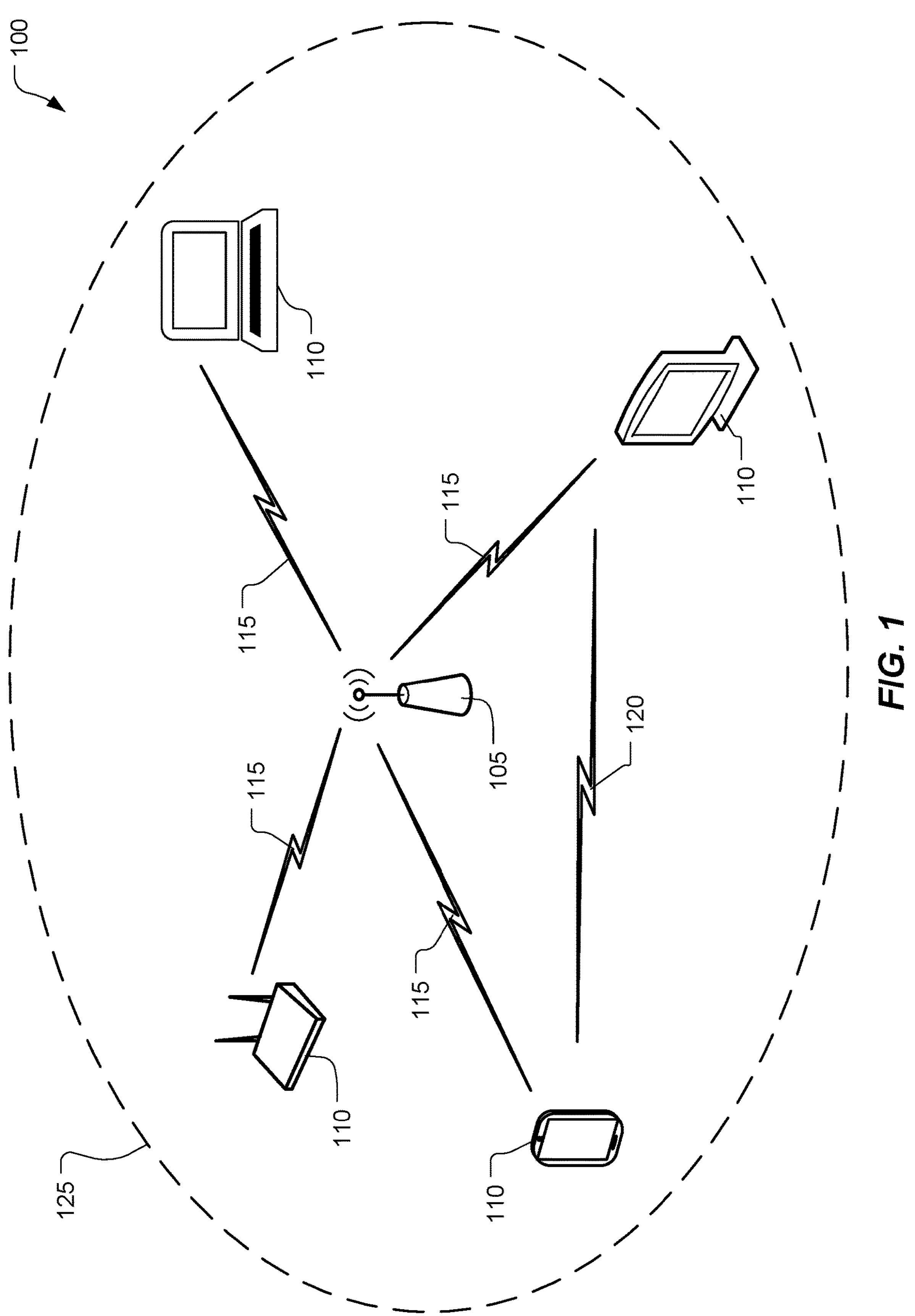
FIG. 1 is a block diagram of an example wireless local area network (WLAN).

Techniques are discussed herein for alerting a user of a virtual reality (VR) system of hazards in the proximate or surrounding environment. The user of a VR system may be immersed in the VR environment via a sensory device such as Head Mounted Device (HMD) configured to provide visual input to the user. While wearing the HMD, or other sensory devices, the VR user is isolated from the physical environment in which the user is located and may not be aware of changes to the proximate physical environment. When deprived of real time sensory feedback or alerts, the VR user may fail to recognize emergency or dangers in their proximate surroundings (also referred to herein as the proximate physical environment). Prior solutions utilize a predefined virtual boundary system to assist the VR user to stay within the boundary to avoid collisions with wall, furniture, or other objects, etc. These prior systems, however, define a small indoor area (e.g., a few meters) and do not monitor for real-time changes to the environment.

The proximity sensing techniques provided herein utilize a VR headset (e.g., HMD) configured for radio frequency (RF) sensing to detect changes to the physical environment. In an example, the RF sensing may be based on Wi-Fi chipsets (e.g., IEEE 802.11be devices) configured to detect motion and measure distances to proximate reflectors (e.g., objects). The HMD may be configured to evaluate the detected object and provide alerts to the user and/or a network stations via a communication link. A multi-link device (MLD) may be configured to communicate with a network (e.g., a Wi-Fi access point) and provide alerts via a first link, while utilizing a second link for RF sensing. Alerts may be provided via the second link to other MLD devices such as a MLD network station. In some implementations, the HMD may be configured to utilize the second link for both RF sensing and network communications.

In an embodiment, RF sensing may be utilized by the HMD to determine attributes of an object such as velocity, direction and size, and alerts may be generated based on one or more of the attributes. The periodicity and/or bandwidth of the RF sensing may be decreased to conserve power, or increased to improve detection accuracy. An outward facing camera may be activated to obtain images of an object, and the HMD or network resource may be configured to characterize a detected object based on the image. The HMD may be configured to provide visual and/or audible alerts to the user based on a detected object. Graphical objects may be displayed in the VR environment (e.g., via the HMD) to notify or alert the user of an object. In camera based systems, images of the object may be displayed to the user. Audio and/or texts may also be used to notify or alert the user of detected objects The RF sensing and alert mechanisms discussed herein have the technical advantage of providing a VR user with near-real time updates of changes to the proximate environment and do not require establishing a pre-defined boundary in which to utilize a VR system. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs) 110, such as mobile stations, head mounted devices (HMDs), personal digital assistants (PDAs), other handheld devices, netbooks, notebook computers, tablet computers, laptops, display devices (e.g., TVs, computer monitors, etc.), printers, IoT devices, etc. While one AP 105 is illustrated, the WLAN network 100 may have multiple APs 105. Each of the wireless devices 110, which may also be referred to as mobile stations (MSs), mobile devices, access terminals (ATs), user equipment(s) (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile. The principles of the present disclosure are described in the context of wireless systems for the purpose of illustration. Nevertheless, it will be understood that these principles are not necessarily limited to wireless systems, and can also be implemented in devices and systems configured to communicate over wired connections.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, 5G-NR sidelink, PC5, and other P2P group connections. The wireless devices 110 in these examples may communicate according to the WLAN radio and baseband protocol including physical and MAC layers from IEEE 802.11, and its various versions including, but not limited to, 802.11b, 802.11be, 802.11g, 802.11a, 802.11n, 802.11ac, 802.11ad, 802.11ah, 802.11ax, and the like. In other implementations, other peer-to-peer connections and/or ad hoc networks may be implemented within WLAN network 100.

Figure 2:
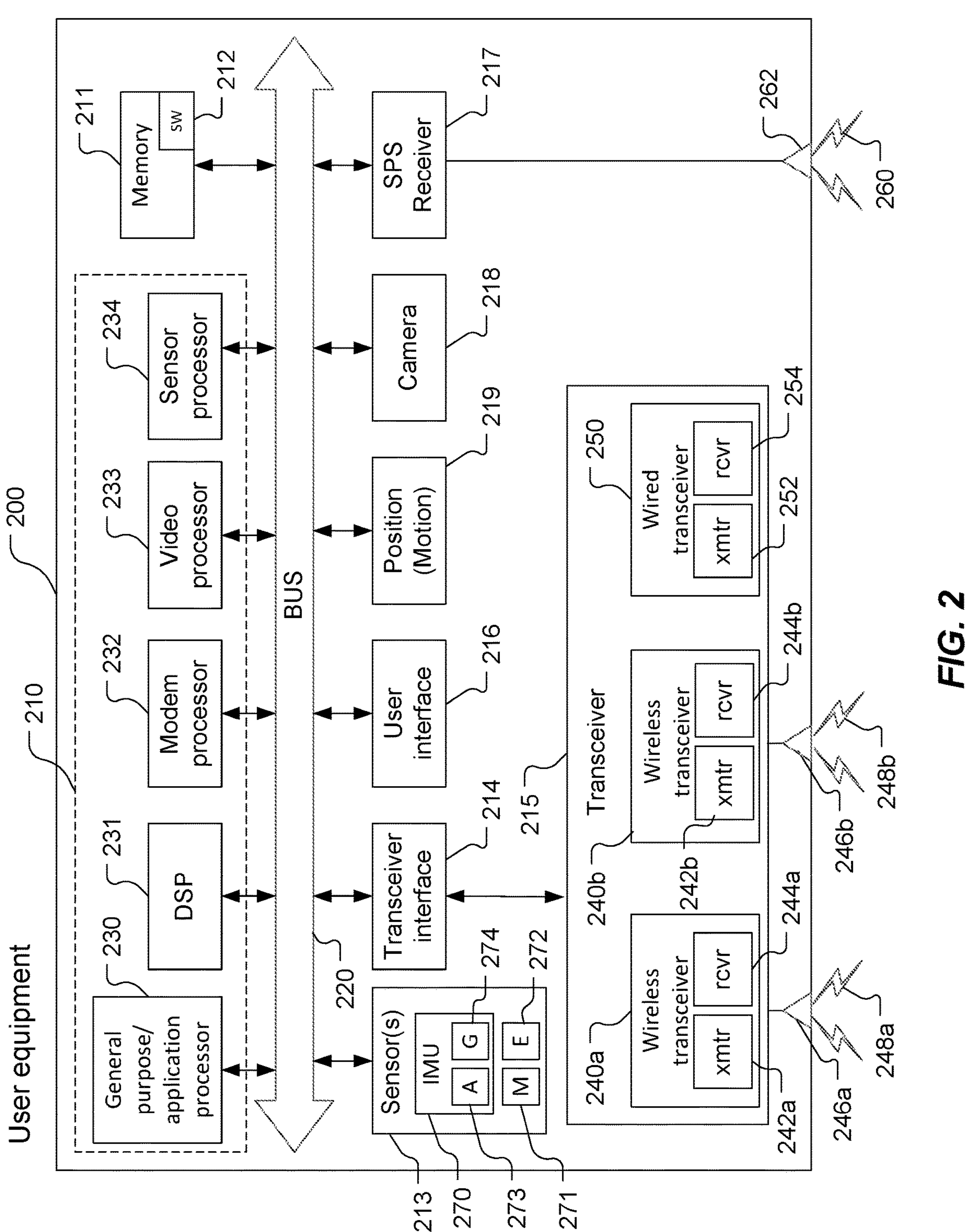
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240*a*, a second wireless transceiver 240*b*, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240*a*-*b*. Other example configurations include one or more of the processors 230-234 of the processor 210, the memory 211, the wireless transceivers 240*a*-*b*, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240*a*-*b*, the memory 211 and a processor 230. A multi-link device may simultaneously utilize the first wireless transceiver 240*a* on a first link using a first frequency band, and the second wireless transceiver 240*b* on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240*a*-*b* and a wired transceiver 250 configured to communicate with other devices through wireless connections and wired connections, respectively. In an example, each of the wireless transceivers 240*a*-*b* may include respective transmitters 242*a*-*b* and receivers 244*a*-*b* coupled to one or more respective antennas 246*a*-*b* for transmitting and/or receiving wireless signals 248*a*-*b* and transducing signals from the wireless signals 248*a*-*b* to wired (e.g., electrical and/or optical) signals and from wired (e.g., electrical and/or optical) signals to the wireless signals 248*a*-*b*. Thus, the transmitters 242*a*-*b* may be the same transmitter, or may include multiple transmitters that may be discrete components or combined/integrated components, and/or the receivers 244*a*-*b* may be the same receiver, or may include multiple receivers that may be discrete components or combined/integrated components. The wireless transceivers 240*a*-*b* may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11ax and 802.11be), WiFi, WiFi Direct (WiFi-D), Bluetooth®, Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with one or more of the antennas 246*a-b*. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240*a-b*) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248*a-b*) for trilateration or mulilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-processor 230 and the memory 211.

Figure 3:
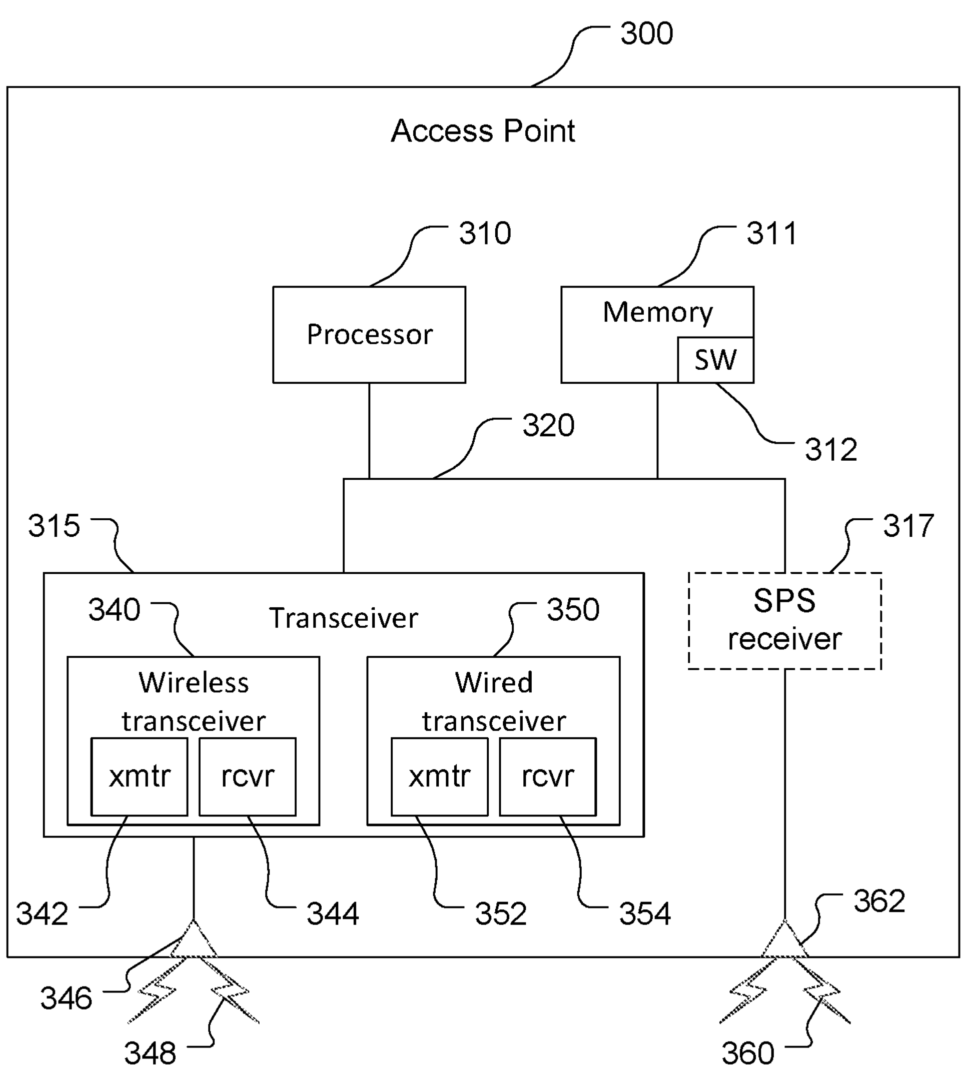
FIG. 3 is a block diagram of components of an example access point.

Referring also to FIG. 3, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax and 802.11be), WiFi, WiFi Direct (WiFi-D), Bluetooth®, Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 4:
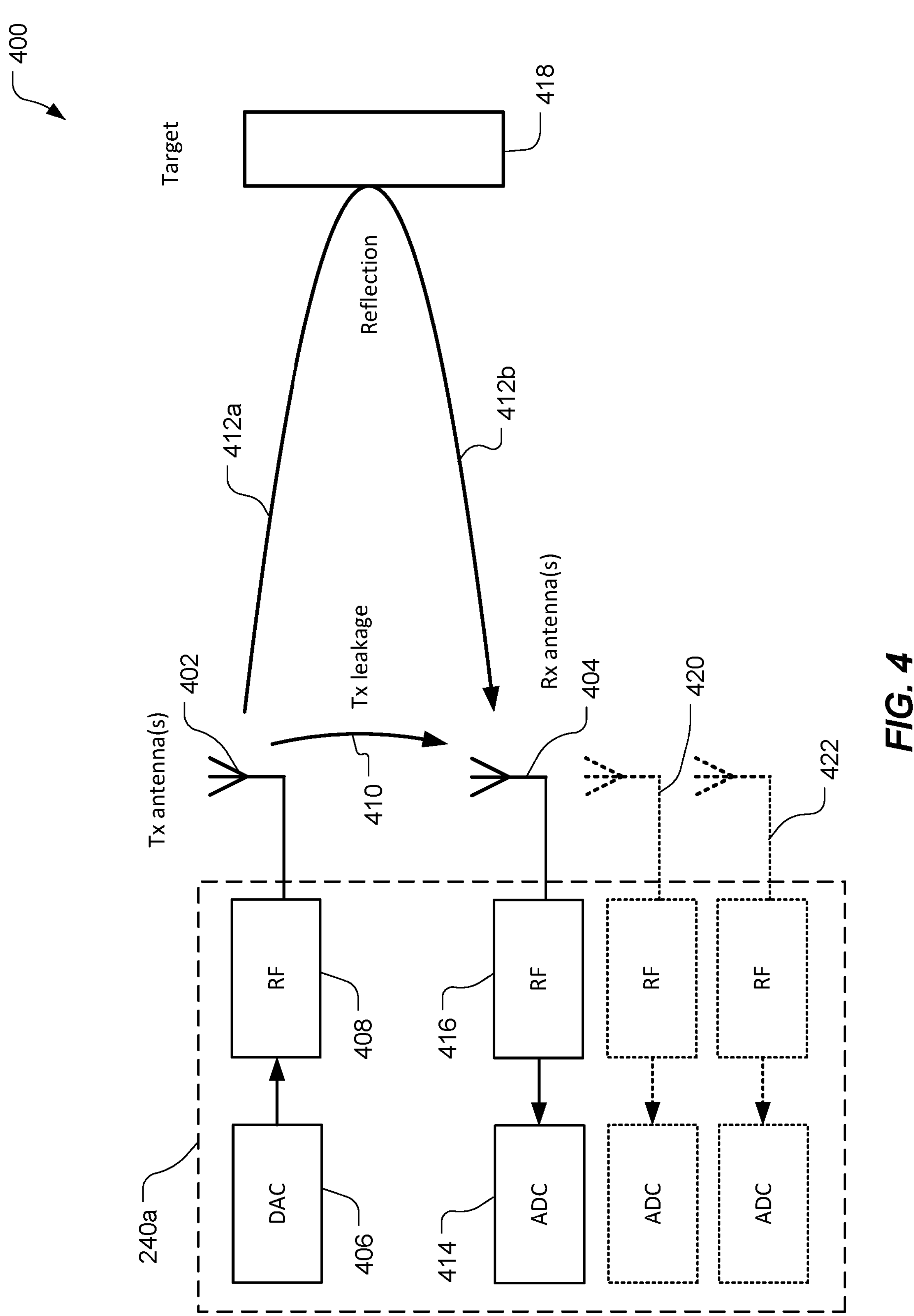
FIG. 4 is a diagram of radio frequency sensing with concurrent transmission and reception by an example wireless device.

Referring to FIG. 4, an example diagram 400 of radio frequency sensing with concurrent transmission and reception by a wireless device is shown. The wireless device, such as the UE 200 or the AP 300, includes a transceiver 240*a*, or transceiver 340 with a plurality of transmit and receive chains configured for concurrent transmission and reception of RF signals. The number of transmit and receive chains in FIG. 4 are examples, and not limitations, as other transceiver and antenna configurations may be used. For example, the transceiver 240*a* may be configured for Multiple Input Multiple Output (MIMO) with two transmit and two receive chains. Other array sizes and configurations may be used. In an example, the transceiver 240*a* may include a transmit chain including a transmit antenna 402 operably coupled to a transmit RF module 408. The transmit RF module 408 is configured to receive a signal from a Digital-to-Analog Converter (DAC) 406 and transmit a corresponding RF signal via the transmit antenna 402. The signal may be generated by a processor such as the modem processor 232 and/or the application processor 230. The transceiver 240*a* may include one or more receive chains including a receive antenna 404, a receive RF module 416, and an Analog-to-Digital Converter (ADC) 414. Additional receive modules may also be used, such as a second receive chain 420 and a third receive chain 422.

In operation, the wireless device may transmit a radio frequency signal 412*a* towards a target 418. A reflected signal 412*b* is the portion of the RF signal 412*a* that is reflected by the target 418 and received by the one or more receive antennas, such as the receive antenna 404. The additional receive chains may enable beamforming/direction detection to enable the wireless device to compute an angle of arrival (AoA) for a received signal. The receive chains may also receive a transmission leakage 410 concurrently with the transmission of the RF signal 412*a*. The transmission leakage 410 may be conductive and/or radiated interference depending on the configuration of the wireless device. For example, physical shielding may be used to reduce the radiated interference between the transmit and receive antennas. In an embodiment, the radio frequency signal 412*a* may be a pre-designed sequence with length 'L'. The pre-designed sequence may be designed to have cyclic autocorrelation properties, such as single carrier Zadoff-Chu sequences, or Orthogonal frequency-division multiplexed (OFDM) like symbols. The sequence may be transmitted repeatedly and continuously for 'n' times, such that the receive chain(s) of the wireless device may start listening at a later time for length 'L' to receive the sequence without missing the signal information. This relaxed time requirement on receive chains means they do not have to start at the same time as the transmitter.

The receive RF module 416 (and the additional receive chains 420, 422) may listen for and receive 'm' number of sequences instead of 1 sequence. For example, the receive RF module 416 may listen for a length of m*L, where 'm' is the number of sequences captured by the receive RF module 416, and m<=n. The UE 200 may combine the received 'm' sequences to improve the signal-to-noise ratio (SNR). The received sequence can be used for RF sensing. For example, a known transmit sequence may be utilized to obtain a channel estimation based on signal correlation techniques. The channel estimation may be processed via an iterative cancellation algorithm to detect leakage and reflection. A time difference between leakage and reflection may be used to estimate a distance to the target 418. Multiple Rx antennas, such as the additional receive chains 420, 422 may be utilized to receive the sequence(s) in the reflected signal 412*b*, determine the channel estimation, and obtain an angle estimation of the reflected signal 412*b*. Changes in the channel estimation may be utilized to detect motion of the target 418. Classification algorithms and/or machine learning on the channel estimation results may be used to identify the type of motion and/or size of the target 418. In an example, the channel estimation may be used to detect changes in pose of the target 418.

The number of transmit and receive chains on the wireless device of FIG. 4 is an example, and not a limitation. Other wireless devices may have multiple arrays, and each array may be comprised of different numbers and patterns of antenna elements. For example, an antenna array may include a matrix of elements in a 1×2, 1×4, 1×5, 1×8, 2×2, 2×4, 2×5, 2×8, 3×4, 3×5, 3×8, etc. Other antenna array matrix dimensions may also be used.

In an embodiment, the wireless device with one or more multi-element antenna arrays may be configured to beamform transmitted and receive RF signals. For example, the transceiver 240*a* may include a radio frequency integrated circuits (RFIC) including with phase shifters to modify the transmit and receive beam gains. The wireless device may be configured to vary the angle of departure (AoD) of the RF signal 412*a*. In an example, the RF signal 412*a* may be swept through different AoDs, and the gain of the corresponding reflected signals may be determined. Varying the AoD of the RF signal 412*a* may be used to determine a direct path to the target 418 (e.g., based on the highest reflected gain). In an example, the beam sweeping may be used to determine changing poses of the object (e.g., based on a series of reflected signals over time). In an embodiment, the transmitted RF signal 412*a* may be a polarized signal and the polarization of the received signal 412*b* may be detected. The change in the polarization between the transmitted and received signal may be used to determine characteristics and/or classify the target 418.

In an example, the processor 230 and/or the DSP 231 may be configured to determine the distance, velocity, and/or size of a target object. The distance may be measured base on the pulse delay associated with the transmission of the RF signal 412*a* and the reception of the received signal 412*b*. The velocity of an target object may be obtained based on a doppler shift of the RF signal 412*a* when the reflection is received. Angular direction may be based on varying the AoD of the RF signal. Signature analysis and inverse scattering techniques as known in the art may be used to detect other attributes of a target object. For example, the size of a target object may be based on the magnitude of the received signal 412*b* and the presence of moving parts on a target object may be based on the modulation of the received signal 412*b*.

Figure 5:
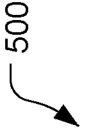
FIG. 5 is a graph of an example receive signal in the wireless device of FIG. 4.
Figure 5:
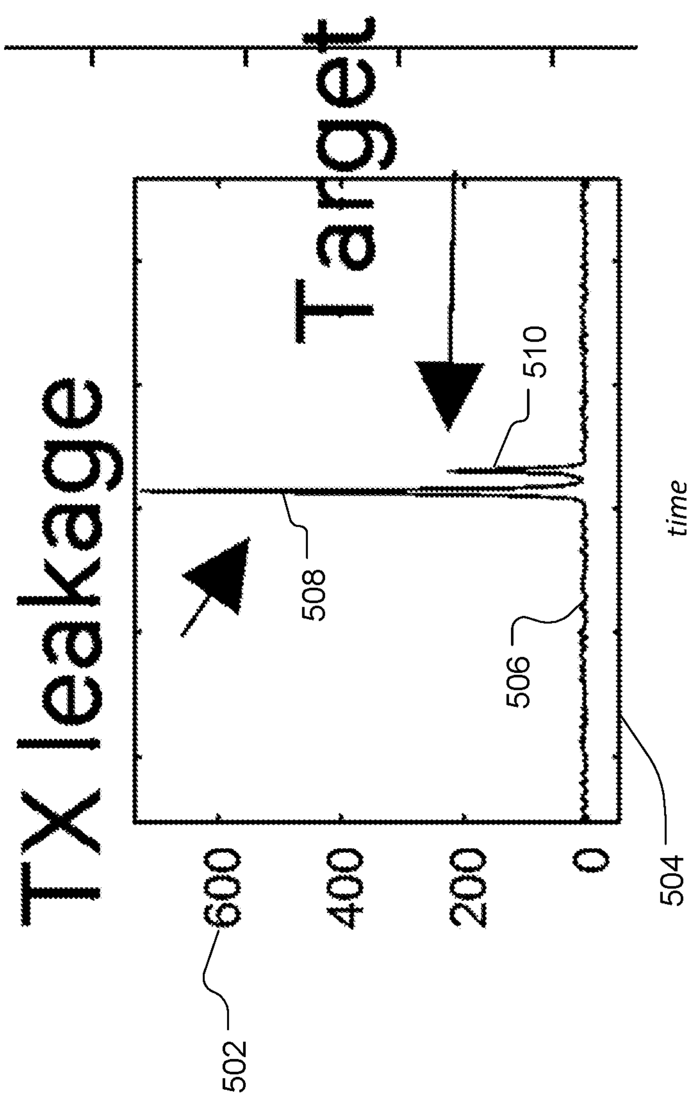

Referring to FIG. 5, with further reference to FIG. 4, a graph 500 of an example receive signal is shown. The graph 500 includes a relative power axis 502, a time axis 504, and a signal response function 506. The signal response function 506 represents the signal detected by the receive antenna 404. A first peak 508 is based on the transmission leakage 410, and a second peak 510 is based on the reflected signal 412*b*. The RF module 416 (and the other receive chains 420, 422) may be configured to reduce the receive gain for the duration of the transmission of the RF signal 412*a*. For example, one or more amplifier components (e.g., Low Noise Amplifiers (LNAs)) in the receivers may be configured with adjustable gain functionality. The receive gain may be reduced to lessen the impact of the leakage on the receive chains. Other iterative cancellation algorithms may be used to reduce the impact of the first peak 508 and improve the detection of the second peak 510. The transmission gain of the RF transmit module 408 may be increased to improve the detection of the reflected signal 412*b*. For example, the transmission gain may be increased iteratively for each of the sequences based on the values of the peak or peaks associated with the reflected signal 412*b*.

In operation, the signal response function 506 includes the transmitted sequences and the corresponding ADC capture in the ADC module 414 is equivalent to channel capture, which may be utilized to enable channel capture based RF sensing use cases. The time difference between the first peak 508 (i.e., the time of transmission) and the second peak 510 (i.e., the reflected signal 412*b*) may be utilized to estimate the distance to the target 418. The AoA of the reflected signal 412*b* may be obtained based on the ADC capture from multiple antennas (e.g., additional receive chains 420, 422). The measured distance and direction information to the target 418 may be used in an indoor mapping application. The bandwidth of the transmitted RF signal 412*a* may vary and is not limited to a Wi-Fi packet bandwidth. For example, wide bandwidths may be based on the DAC and ADC rates and analog filter bandwidths which may be larger than the Wi-Fi packet bandwidth. The transmission and reception of the RF signals 412*a* may be performed within hundreds of microseconds and thus the impact on Wi-Fi communications may be minimal. Thus, the RF sensing techniques described herein may be used concurrently with Wi-Fi data exchange functionality.

Figure 6A:
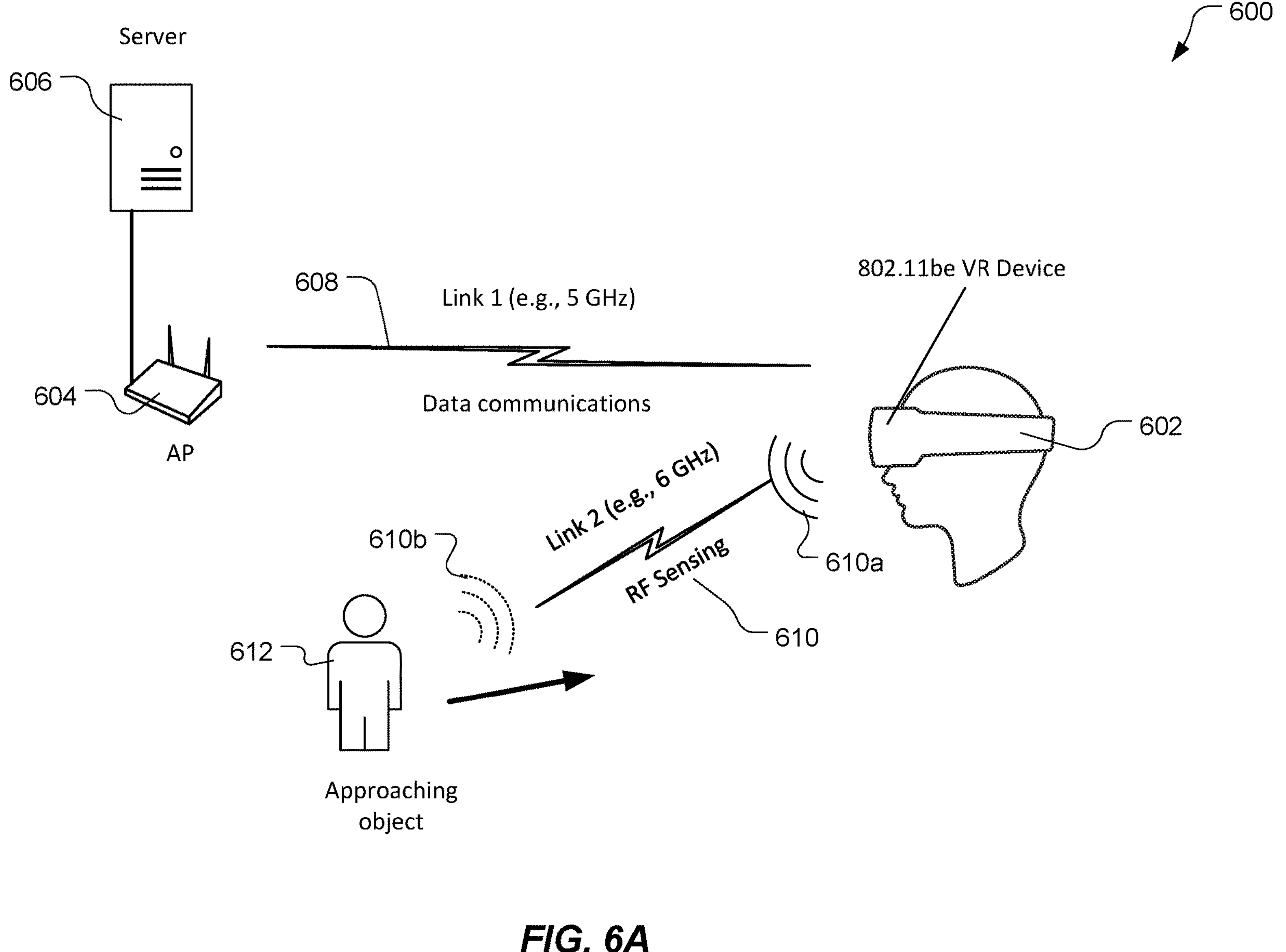
FIG. 6A is a diagram of monostatic motion sensing with an example virtual reality system.

Referring to FIG. 6A, with further reference to FIG. 4, a diagram 600 of monostatic motion sensing with an example virtual reality system is shown. The virtual reality system may include a UE such as a HMD 602. The HMD 602 may include some or all of the components of the UE 200, and the UE 200 may be an example of the HMD 602. The HMD 602 may be configured to operate with the IEEE 802.11be Wi-Fi standard and configured as a multi-link device (MLD) for multi-link operation (MLO). MLO enables devices to simultaneously transmit and receive across different bands and channels. In an embodiment, the HMD 602 may include a plurality of transceivers, such as one or more of the transceiver 240*a* in FIG. 4. For example, the HMD 602 may utilize multiple transceivers to communicate with an access point (AP) 604 via a first wireless link 608 (e.g., in the Wi-Fi 5 GHz band) while simultaneously communicating or performing RF sensing with a second wireless link 610 (e.g., in the Wi-Fi 6 GHz band). In operation, the AP 604 may be communicatively coupled to a network server 606 (e.g., via a wired or wireless communication link), and configured to send and receive data over the first wireless link 608 with the HMD 602. For example, the network server 606 may be a virtual gaming platform and the user of the HMD 602 may be participating in a virtual gaming experience. The HMD 602 may be configured to simultaneously transmit RF sensing signals, such as depicted in FIG. 4, to detect potential objects which may endanger or interfere with the user. For example, the HMD 602 may utilize the second wireless link 610 to transmit a radio frequency signal 610*a* and receive a reflected signal 610*b* from a target object 612 (e.g., an approaching child). The HMD 602 may transmit 200 microsecond RF sensing signals at a periodic interval (e.g., 2 ms) which will utilize a small portion of the transmit time available on the second wireless link 610. In an embodiment, the remaining time on the second wireless link 610 may be used for data traffic with other devices. For example, if the AP 604 is configured for MLO, the HMD 602 may utilize both the first wireless link 608 and the second wireless link 610 for data transfer or other operations in addition to performing RF sensing. Utilizing the first wireless link 608 in a data only mode, and the second wireless link 610 for RF sensing and data may reduce the latency of data transmitted from the AP 604 while enabling the safety of object detection based on the RF sensing on the second wireless link 610.

Figure 6B:
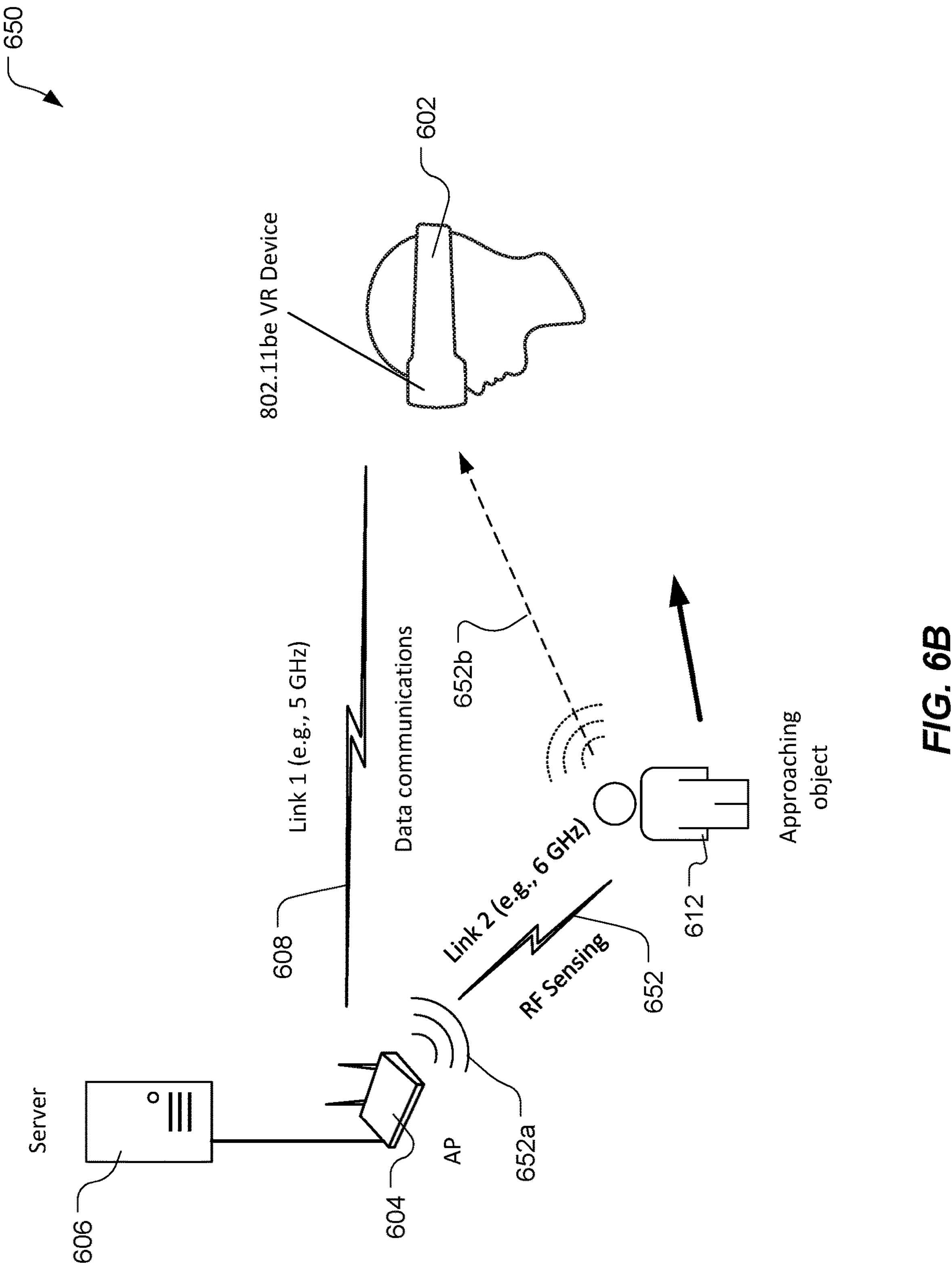
FIG. 6B is a diagram of bistatic motion sensing with an example virtual reality system.

Referring to FIG. 6B, with further reference to FIG. 6A, a diagram 650 bistatic motion sensing with an example virtual reality system is shown. In an embodiment, the AP 604 may be configured for MLO and may utilize a second link 652 to transmit RF sensing signals 652*a* in one or more directions, such as generally towards the HMD 602. The RF sensing signals 652*a* may be reflected off objects, such as the target object 612, and a reflected signal 652*b* may be detected and measured by the HMD 602. For example, during a scanning phase the AP 604 may be configured to transmit one or more sensing-scanning reference signals (SSRS) and one or more stations (e.g., the HMD 602) may be configured to provide beam reports identifying one or more target objects associated with a single SSRS. The HMD 602 may be configured to provide reports via the first link 608 and/or via the second link 652. In an embodiment, the message traffic transmitted from the AP 604 on the first link 608 may be used by the HMD 602 to sense the target object 612, or other objects in the environment. The periodicity of the transmissions on the first link 608 may be controlled by the AP 604. In operation, the HMD 604 may be configured to utilize the second link 652 to request periodic sensing packets to be transmitted from the AP 604 on the second link 652, and the HMD 602 may also utilize the existing traffic on the first link 608 to further improve sensing. In an example, the HMD 602 may obtain Channel State Information based on the received signals, which may include signals from a direct path between the AP 604 and the HMD 602, as well as signals from reflected paths bounced off nearby reflectors. The HMD 602 may be configured to compare the time difference between the direct path and each of the reflected paths to estimate a distance to a target. The HMD 602 may be configured to determine an angle of arrival of each of the reflected paths to estimate the direction of the target, and to analyze Doppler Frequency Shift of the reflected paths to estimate the movement of target. In an example, the AP 604 may be configured to transmit RF signals at a higher power as compared to the HMD 602, and may enable the HMD 602 to conserve battery power.

Figure 7:
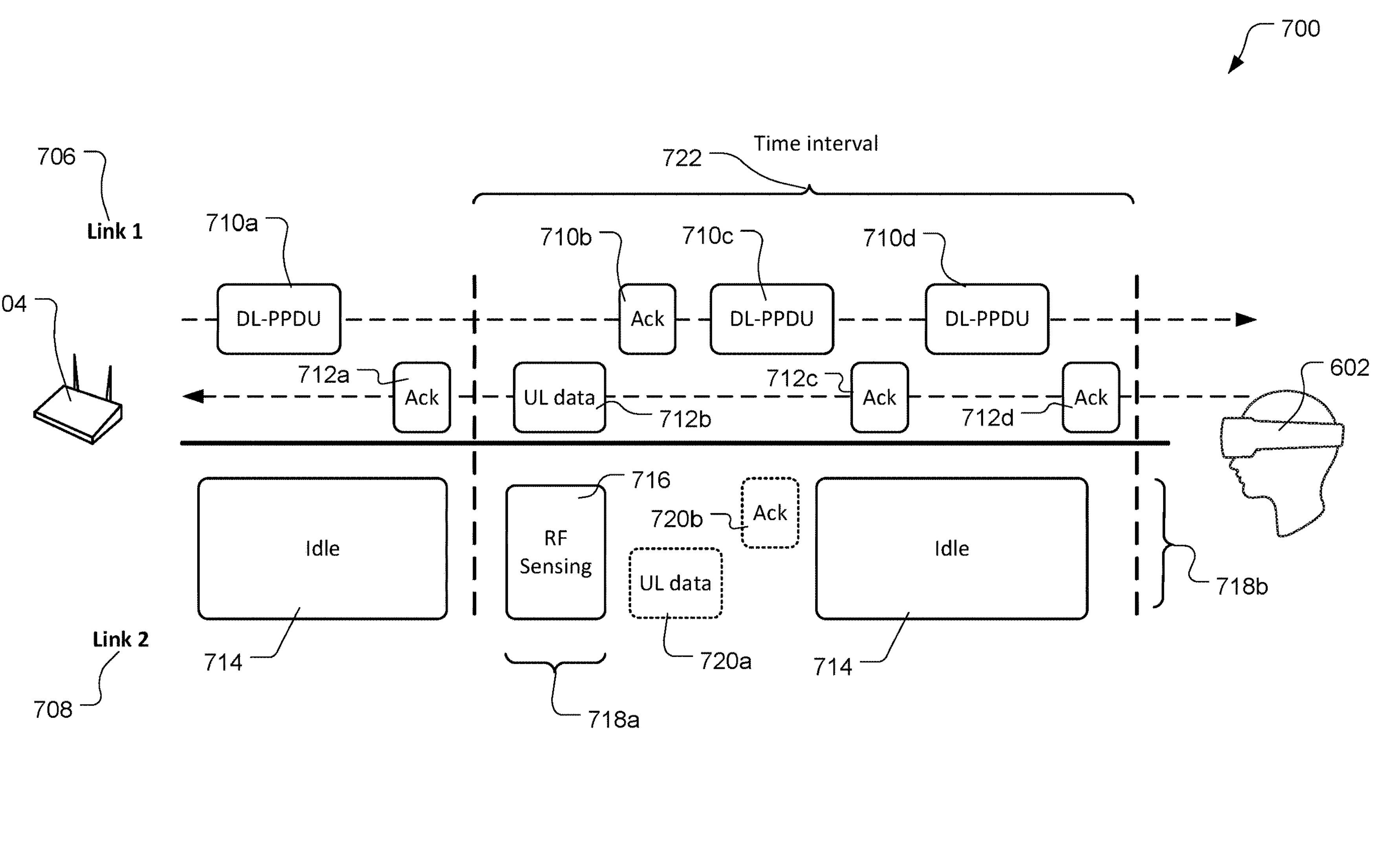
FIG. 7 is an example signal flow diagram for radio frequency sensing with a virtual reality system.

Referring to FIG. 7, with further reference to FIGS. 4 and 6, an example signal flow diagram 700 for radio frequency sensing with a virtual reality system is shown. The diagram 700 includes the HMD 602 and an AP 704. The AP 704 may be connected to one or more network servers or other devices such as the network server 606 (not shown in FIG. 7). In an embodiment, the HMD 602 is a MLD configured to utilize multiple bands such as the 2.4 GHz, 5 GHz and 6 GHz Wi-Fi bands. A first link 706 may utilize one of the bands and a second link 708 may utilize another one of the bands. In an example, the first link 706 may be used for data exchanges between the AP 704 and the HMD 602, and the HMD 602 may use the second link 708 for RF sensing. The first link 706 may include downlink (DL) data frames such as Physical Layer Convergence Procedure (PLCP) Protocol Data Units (PPDU) and acknowledgment frames transmitted from the AP 704 to the HMD 602, and uplink (UL) acknowledgment and data frames. For example, a first DL-PPDU frame 710*a* may be transmitted by the AP 704 and the HMD 602 may transmit a first Ack frame 712*a* in response. The HMD 602 may transmit one or more UL Data frames 712*b* and the AP 704 may send an Ack frame 710*b* in response. The AP 704 may send subsequent DL-PPDU frames and receive corresponding Ack frames from the HMD 602, such as a second DL-PPDU frame 710*c* and a third DL-PDDU frame 710*d*. The HMD 602 may be configured to transmit the respective second Ack frame 712*c* and third Ack frame 712*d* as depicted in the signal flow diagram 700.

The HMD 602 may utilize the second link 708 for RF sensing and other operations. For example, the HMD 602 may perform RF sensing operations 716 such as described in FIG. 4 during a portion of a time interval 722. The RF sensing operations 716 may be performed in a sensing period 718*a* which is a portion of the time interval 722. The second link 708 is not dedicated to RF sensing and may include idle periods 714 which may be used for other operations. The time interval 722 may be approximately 2 milliseconds and the sensing period 718*a* may be less than 200 microseconds. Other time periods may also be used. The RF sensing operations 716 may also utilize a varying amount of bandwidth 718*b* based on power and detection accuracy requirements. For example, a low bandwidth (e.g., 20 MHz) may be used to generate a coarse estimate of the surrounding environment and a higher bandwidth (e.g., 160 MHz) may be used for a finer resolution of the environment. The time interval 722 may also be modified to increase the resolution of RF sensing measurements. The HMD 602 may be configured to utilize the first link 706 to alert a network server via the AP 704 based on objects detected with the RF sensing operations. In an embodiment, the RF sensing operations 712 may be synchronized with the UL Data frame 712*b* and the UL Data frame 712*b* may include an indication of the RF sensing based alert. In another example, an Ack frame 712*c*, 712*d* may include an indication of an RF sensing based alert. Utilizing UL data frames may enable larger data payloads to be used for the indication of the RF sensing based alert (e.g., may enable more information to be provided about a target object). Utilizing an Ack frame may decrease the available data payload, but may have the advantage of reducing the lag time between detecting an object and providing an alert to the AP 704.

In an embodiment, the AP 704 may be configured for MLO and may utilize the second link 708 for bistatic RF sensing and data communications with the HMD 602. In an example, the HMD 602 may optionally transmit a UL Data frame 720*a* to the AP 704 and the AP 704 may send and Ack frame 720*b* via the second link 708. The HMD 602 may be configured to communicate with other stations, and/or perform other operations with the second link 708 in addition to RF sensing. In an embodiment, the HMD 602 may be configured to send sensing request frames to the AP 704 periodically on the second link 708 (e.g., a UL data frame 720*a*). The AP 704 may transmit a sensing frame (e.g., during the RF sensing operations 716). The HMD 602 may be configured to receive a sensing frame from AP 704 and use the sensing frame to sense the environment and detect nearby objects. In an embodiment, the periodicity (e.g., time interval 722), sensing period 718*a*, and the bandwidth 718*b* may be controlled by HMD 602. In an example, a sensing request frame can be QoS Null Frame, and sensing frame can be ACK frame in response to QoS Null Frame. Other frame types may also be used.

Figure 8:
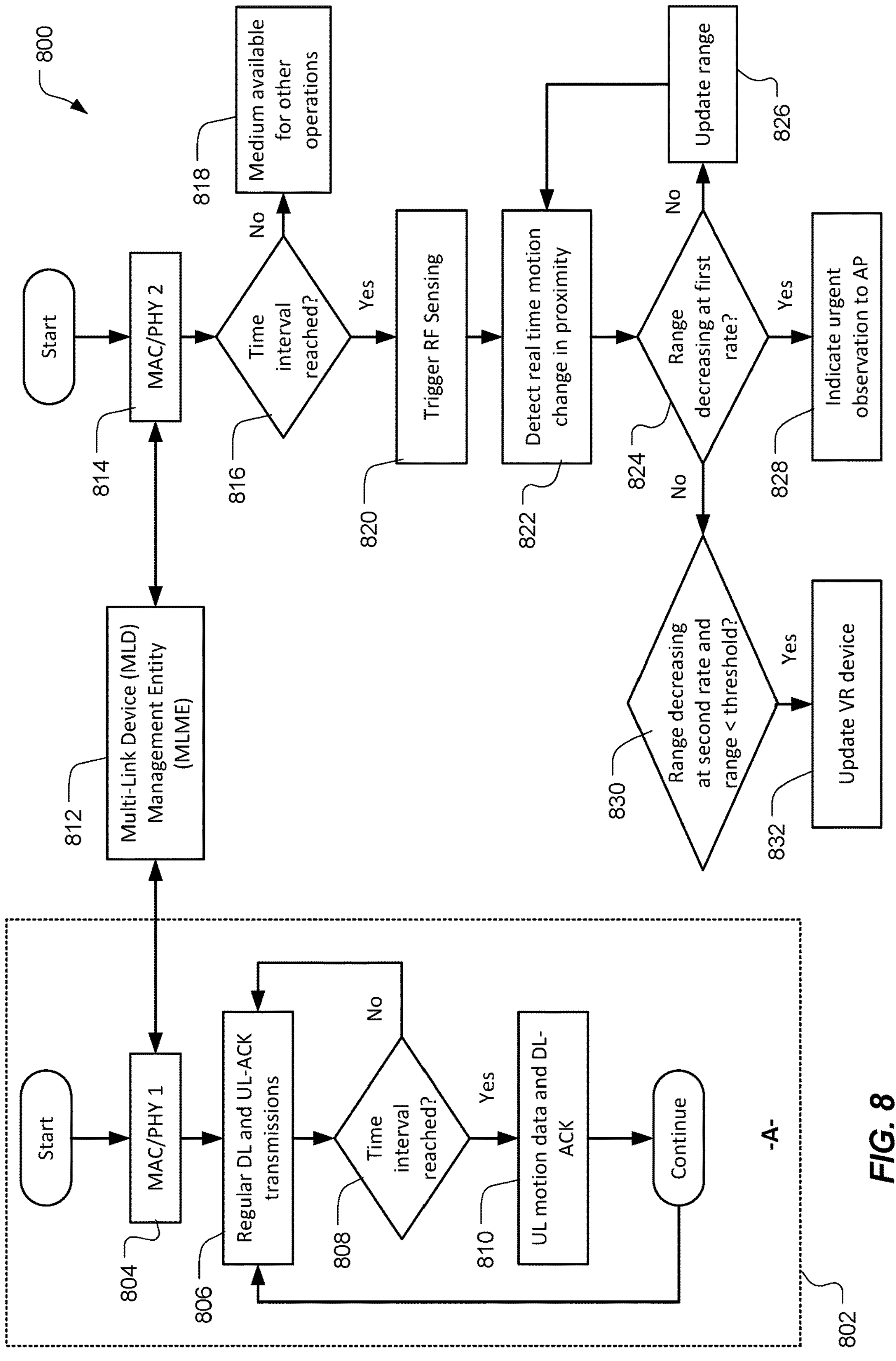
FIG. 8 in an example process flow for a method of providing an alert to a user in a virtual reality system.

Referring to FIG. 8, with further reference to FIG. 7, an example method 800 of providing an alert in a virtual reality system includes the stages shown. The method 800 is, however, an example and not limiting. The method 800 may be altered, e.g., by having stages added, removed, rearranged, combined, performed concurrently, and/or having single stages split into multiple stages. The HMD 602, including the transceiver 215 and the processor 230, is a means for implementing the method 800. In an embodiment, a subset 'A' 802 of the method 800 may be performed using the first link 706 and other stages of the method 800 may be based on RF sensing obtained with the second link 708. At stage 812, a MLD management entity (MLME) is configured to manage operations of the Medium Access Control (MAC) sublayers associated with the first link 706 and the second link 708. In general, the MLME is a logical entity which provides an interface MAC data service access point (SAP) to allow a station management entity (SME) to control the MAC sublayer. At stage 812, the MLME is configured to send and/or receive data between the first link 706 (i.e., at stage 804) and the second link 708 (i.e., at stage 814). At stage 806, the HMD 602 is configured to utilize the first link 706 for regular DL and UL-Ack transmissions, such as the DL-PPDUs 710*c*, 710*d*, and the corresponding acknowledgement frames 712*c*, 712*d* depicted in FIG. 7. At stage 808, the HMD 602 determines if the time interval 722 has expired and then at stage 810 is configured to send the UL data frame 712*b* and receive the DL-Ack frame 710*b* including motion data obtained via the second link 708. In an example, the time interval 722 is approximately 2 ms but may be increased or decreased to adjust the sensitivity of the RF sensing.

At stage 814, the HMD 602 is configured to utilize the second link 708 for RF sensing and provide motion data to the MLME. The RF sensing operations 716 may be executed periodically, and at stage 816, the HMD 602 is configured to determine if the time interval 722 has been reached. At stage 818, if the time interval has not been reached, the HMD 602 may utilize the idle periods 714 on the second link 708 for other operations such as communicating with the AP 704 or other neighboring stations. At stage 820, if the time interval has been reached, the HMD 602 may perform a RF sensing operation 716 as described in FIG. 4. At stage 822, the HMD 602 is configured to determine if the proximity of a detected object has changed and to determine a range decreasing rate based on the rate of the change. The range decreasing rate may be compared to one or more threshold values to generate different alerts. In a first example, at stage 824, a first range decreasing rate may be a relatively high range decreasing rate indicating that the detected object and the HMD are moving rapidly towards one another and that the user may be in danger. In this case, at stage 828, the HMD may provide the motion information, and/or other alert information, to the AP 704 via the first link 706 so the AP 704 may stop further DL transmissions and display an alert to inform the user of the possible danger. At stage 826, if the range decreasing rate of the object is less than the first range decreasing rate, the HMD 602 may continue to update the range to the object and the corresponding range decreasing rate information. In a second example, at stage 830, a second range decreasing rate may be a relatively lower rate indicating that the detected object and user are moving towards one another at a slow rate and the risk of danger is less than an object at the first range decreasing rate. The HMD 602 may also determine if the slower moving object is within a threshold distance (e.g., 2, 3, 5 meters, etc.) to determine if an alert is necessary. In an embodiment, the size of an object may be considered when determining the risk level and necessity for an alert. For example, a larger size object may have a higher risk and more likely to trigger an alert. At stage 832, if the object is moving at the second range decreasing rate and it is within a threshold distance, the HMD 602 may be configured to provide an alert (e.g., visual, auditory, haptic) or display other objects associated with the detected object. For example, the HMD 602 may utilize a camera to display the object in real time within the VR display, or display another graphic object to alert the user of the detected object. The alert may include a sound based on the type of object. For example, the HMD 602 may provide an announcement in the VR audio channel indication the type of object (e.g., "There is a running dog at Velocity V and Distance D"). In an embodiment, the HMD 602 may also depict the object in the VR display based on the type of object (e.g., a VR dog running at Velocity V and Distance D). Other alerts based on the object attributes may also be generated. For example, a haptic response may be based on the velocity and distance associated with a target object. A frequency and/or an amplitude of a vibration may be increased based on an increased velocity and/or a decrease in distance.

Figure 9:
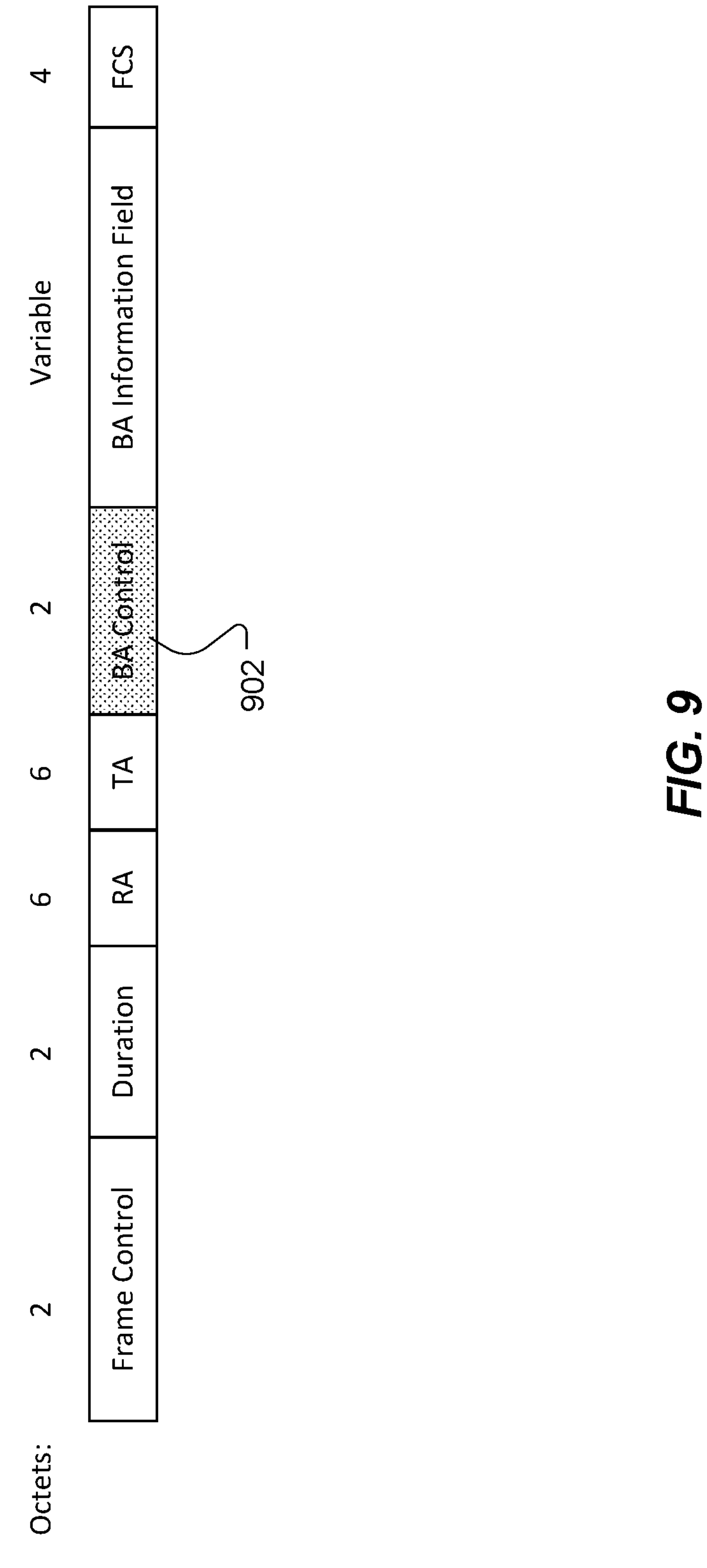
FIG. 9 is an example block acknowledgment frame for providing an alert in a virtual reality system.

Referring to FIG. 9, with further reference to FIGS. 7 and 8, an example block acknowledgment frame 900 for providing an alert in a virtual reality system is shown. The frame 900 is based on the 802.11 MAC frame format and may include standard frames such as a frame control field indicating the type of frame format (e.g., control, management, or data), a duration field indicating at time a channel will be allocated for transmission of the frame, Receiver and Transmitter Address fields indicating the MAC addresses of the AP 704 and the HMD 602, a block acknowledgment information containing protocol data, and a frame check sequence (FCS) field as a redundancy check. In an embodiment, a block acknowledgment control field 902 may be used by the HMD 602 to provide motion based alert information to the AP 704. For example, a reserve bit in the BA control field 902 may be used to indicate a urgent observation or emergency to the AP 704, and the AP 704 (or server 606) may be configured to interrupt the data stream on the first link 706 to provide the HMD 602 with alert information. The BA control field 902 is an example for providing alert information from the HMD 602. Other fields in the frame 900, and/or other data packets, such as the UL data frame **712*b*** may also be used.

Figure 10:
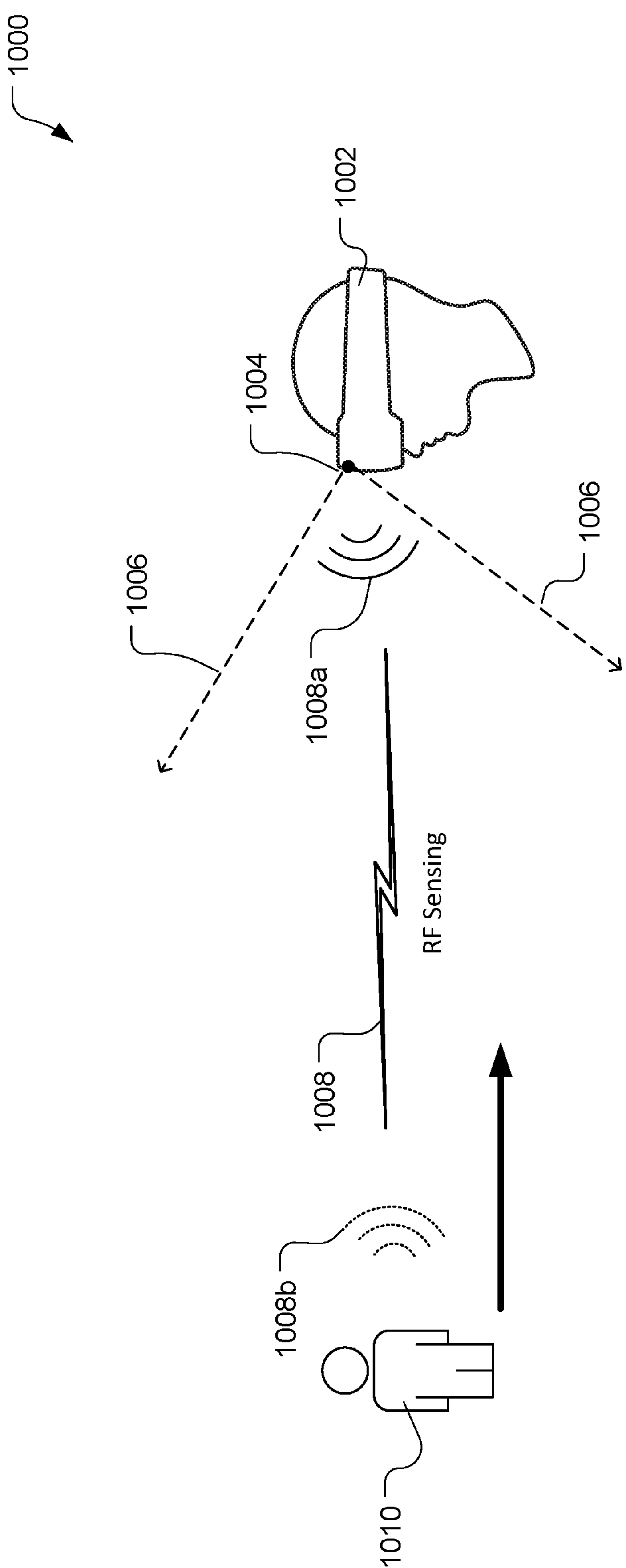
FIG. 10 is a diagram of camera assisted radio frequency sensing based motion detection in a virtual reality system.

Referring to FIG. 10, a diagram 1000 of camera assisted RF sensing based motion detection in a virtual reality system is shown. The diagram 1000 includes an HMD 1002, which may include some or all of the components of the UE 200, and the UE 200 may be an example of the HMD 1002. In an example, the HMD 1002 may be the HMD 602. The HMD 1002 may include one or more outward facing cameras 1004 configured with a field of vision 1006 around a user of the HMD 1002. The camera 218 may be examples of the one or more cameras 1004. In operation, the HMD 1002 may be configured to perform RF sensing operations such as described in FIG. 4 via a communication link 1008. For example, the HMD 1002 may be configured to transmit RF signals **1008*a* to areas proximate to the HMD 1002, and receive reflected signals 1008*b* based on the proximity of target objects 1010, such as an approaching small child. In an embodiment, the HMD 1002 may be a MLD configured to utilize a second link for communication with an AP (not shown in FIG. 10). The HMD 1002 may be configured to utilize RF sensing operations in combination with the cameras 1004. In an example, the cameras 1004 may be configured to detect motion change associated with the target object 1010. The cameras 1004 may be capable of operating in an always-on state, but such operations may consume excessive power and reduce the operating time of the HMD 1002. A technical advantage of preserving battery power may be achieved by combining RF sensing operations with the cameras 1004 and allowing the cameras 1004 to enter a low power mode (e.g., camera off) and then activating an image capture mode (e.g., camera on) based on motion detected with the RF sensing operations. Further, images of a target object obtained with the cameras 1004 may enable the HMD 1002 to classify the target object and utilize the classification to assess the potential threat to the user. The RF sensing operations may be configured to determine attributes of a target object such as a velocity, a distance, and a size of the object, but the RF sensing may not be sufficient to determine the material composition or context of the object. Images obtained by the cameras 1004 may be used to further classify and assess the target object. For example, image classification may be trained to determine whether the target object is a pillow or a table, and the HMD 1002 may be configured to recognize that a pillow would not be as dangerous as a table. Similarly, an image of a running child may infer a lower danger level than an image of a large running dog without a leash. Other general relationships may be formed based on images obtained by the cameras 1004**.

Figure 11:
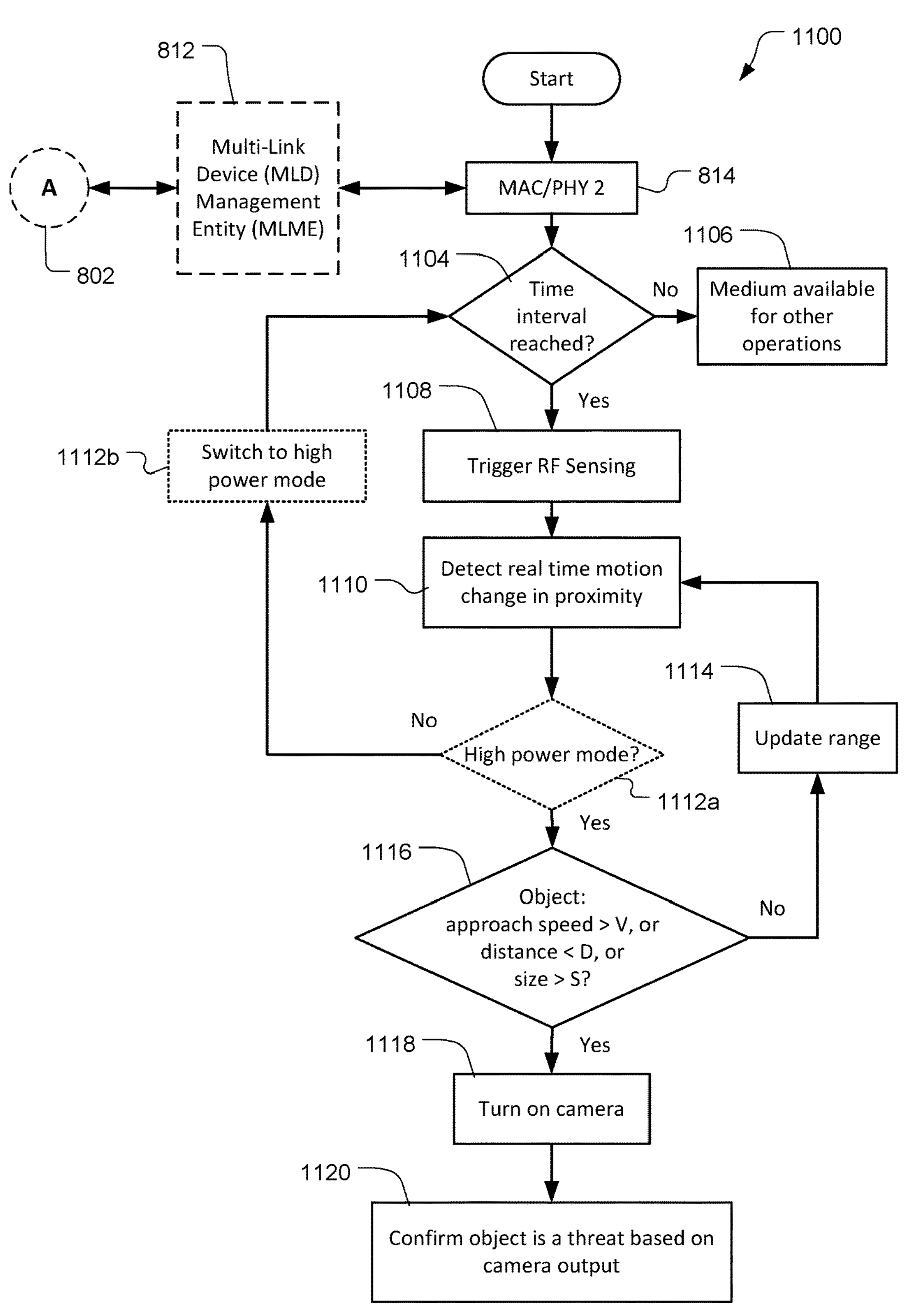
FIG. 11 is an example process flow for a method of utilizing a camera and radio frequency sensing for motion detection and object classification.

Referring to FIG. 11, with further reference to FIGS. 7-10, a method 1100 of utilizing a camera and radio frequency sensing for motion detection and object classification includes the stages shown. The method 1100 is, however, an example and not limiting. The method 1100 may be altered, e.g., by having stages added, removed, rearranged, combined, performed concurrently, and/or having single stages split into multiple stages. In an embodiment, the HMD 1002 may be configured as a MLD capable of communicating with an AP on a first link and RF sensing on a second link. The HMD 1002 may also be a non-MLD device and utilize a single link for RF sensing and RF communications (e.g., during the idle periods 714). In an example, the HMD 1002 may be configured as an independent system and may perform RF sensing without communicating with a network. A MLD capable device may include the MLME at stage 812 and configured to execute the subset 'A' 802 of the method 800 on a first link, and the method 1100 on a second link. In an example, the HMD 1002 may perform the method 1100 on a single link.

In an embodiment, at stage 814, the HMD 1002 may be configured to utilize the second link 708 for RF sensing and provide motion data to the MLME. The RF sensing operations 716 may be executed periodically, and at stage 1104, the HMD 1002 may be configured to determine if the time interval 722 has been reached. At stage 1106, if the time interval has not been reached, the HMD 1002 may utilize the idle periods 714 for other operations such as communicating with the AP 704 or other neighboring stations. At stage 1108, if the time interval has been reached, the HMD 1002 may perform a RF sensing operation 716 as described in FIG. 4. At stage 1110, the HMD 1002 may be configured to determine if the proximity of a detected object has changed. In an embodiment, at stage 1112*a* the HMD 1002 may optionally determine a RF sensing power mode and change the mode of the RF sensing between low power and high power at stage 1112*b*. In an example, the RF sensing operation may utilize less than 200 microseconds of airtime. In a low power mode, the periodicity (e.g., time interval 722) may be relatively low (e.g., 100 ms) until a motion is detected at stage 1110. Once a motion is detected, the periodicity may be increased (e.g., 10 ms or lower) to track the distance, orientation and speed of motion. In an embodiment, the bandwidth of the RF sensing signal may be decreased to conserve power or increased to improve detection resolution. For example, to reduce power consumption, the method 1100 may initially utilize a low bandwidth (e.g., 20 MHz) to generate a coarse estimation of the surrounding environment. When an object is detected at stage 1110, the HMD 1002 may be configured to switch to high bandwidth (e.g., 160 MHz) at stage 1112*b*. The relatively higher bandwidth will use more power than the low bandwidth, but will enable an improved resolution estimation of the environment.

Figure 12A:
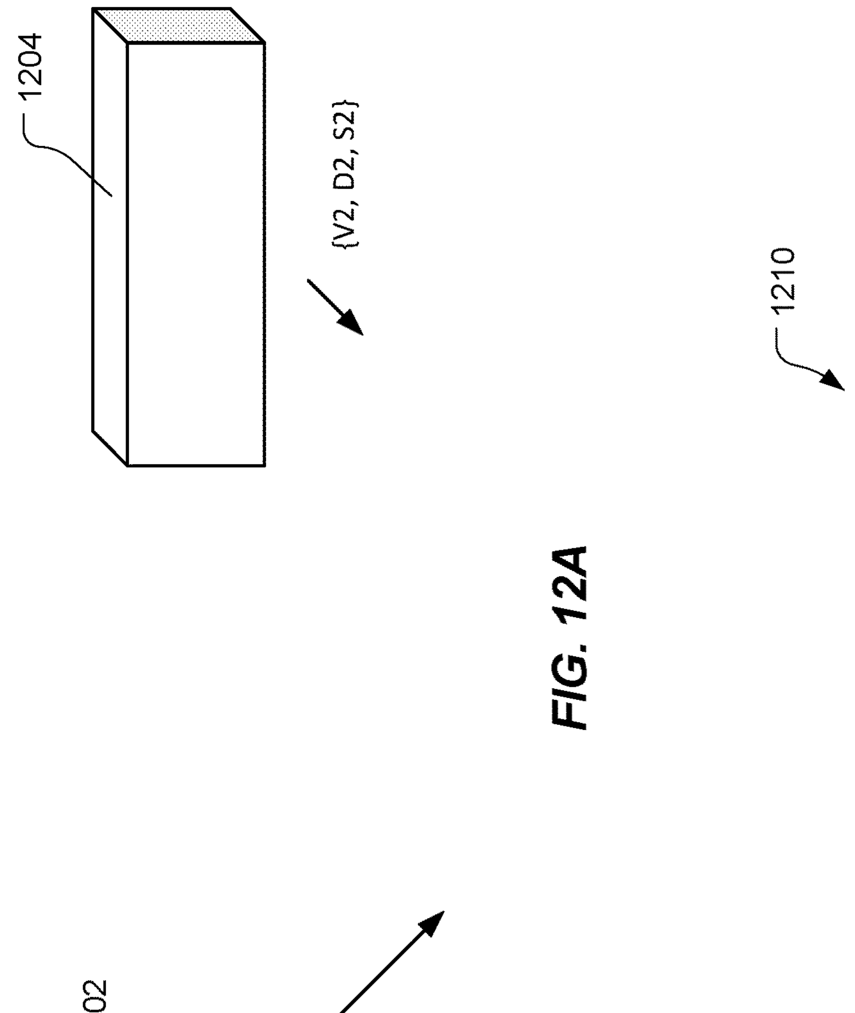
FIG. 12A is an example graphic user interface object for use in a virtual reality system.

At stage 1116, the HMD 1002 is configured to determine one or more attributes associated with a detected object based on the RF sensing. As example, and not limitations, the one or more attributes may include an approach speed, a distance and a size. For example, referring to FIG. 12A, a first object 1202 may be associated with a first set of velocity, distance and size attributes (e.g., {V1, D1, S1}), and a second object 1204 may be associated with a second set of velocity, distance and size attributes (e.g., {V2, D2, S2}). Other attributes such as bearing, elevation, closest point of approach (CPA), estimated time of arrival (ETA), may also be determined based on the RF sensing operations. The attributes may be compared against threshold values such as an approach speed value V, a distance value D, and a size value S. The cameras 1004 may be activated based on the results of one or more comparison operations between the measured attributes and the threshold values. For example, at stage 1118, the cameras 1004 may be activated (e.g., turned on) if the approach speed exceeds V1, or the distance is less than D1, or the size is greater than S1. Other logical combinations, attributes and corresponding threshold values may also be used as conditions for energizing the cameras 1004. If the conditions are not satisfied, then at stage 1114 the range information may be updated and the process may iterate back to stage 1110.

Figure 12B:
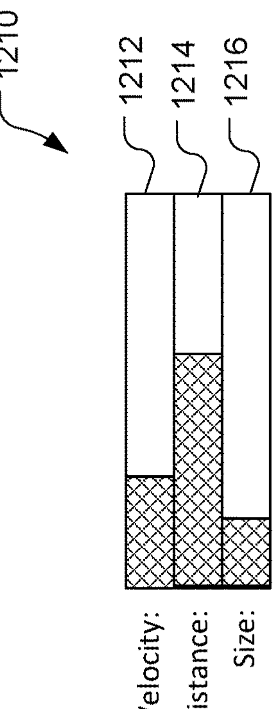
FIG. 12B are example target objects and attributes.
Figure 13:
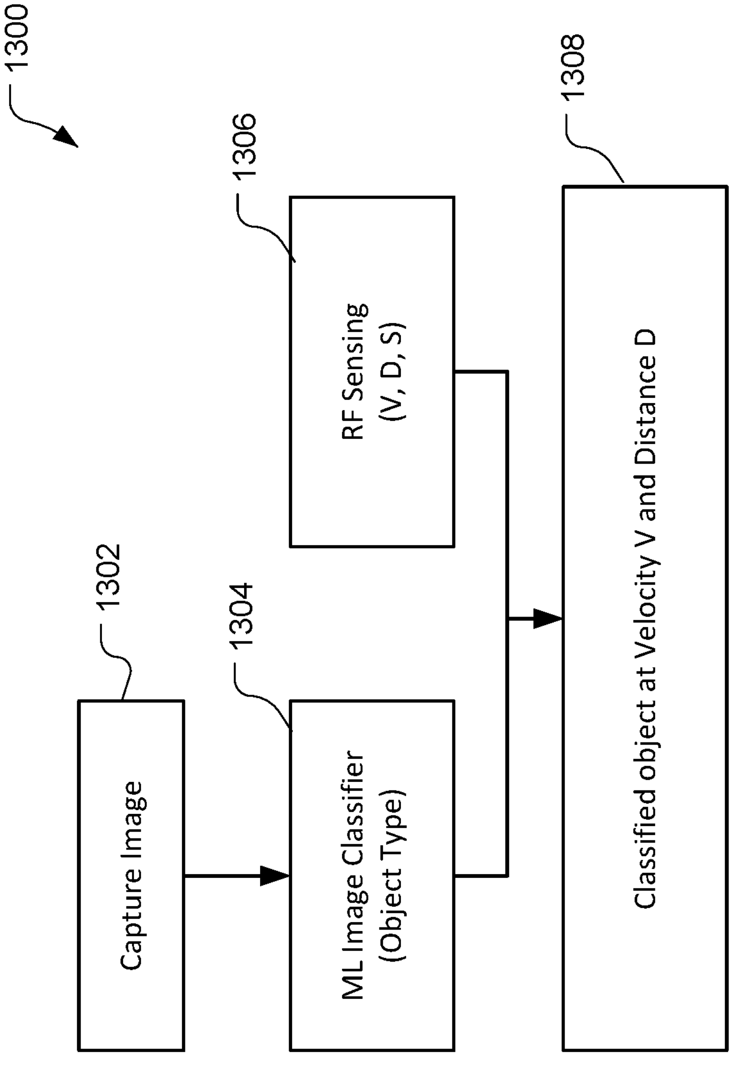
FIG. 13 is an example process flow for a method of classifying a target object.

At stage 1120, the HMD 1002 may be configured to determine whether the detected object is a threat based on one or more images obtained by the cameras 1004. In an example, machine learning may be used to classify objects based on the image information and the RF sensing information. For example, referring to FIG. 13, a method 1300 of classifying a target object is shown. At stage 1302, the HMD 1002 may obtain one or more images with the cameras 1004. At stage 1306, the HMD 1002 may determine the attributes based on RF sensing operations. At stage 1304, the HMD 1002, or other network entity, may utilize machine learning (ML) classifier models to determine an object type. The ML models may be based on supervised and/or unsupervised learning. Training data of images of known objects and corresponding RF sensing attributes and the associated outputs (e.g., danger level) may be used to map an association between camera and RF sensing inputs and the predicted outputs. The models may be based on supervised techniques such as classification and regression. Unsupervised techniques such as clustering, dimensionality reduction, anomaly detection, and association rule mining may also be used to develop the machine learning models. At stage 1308, the HMD 1002 may utilize the ML object type information and the attributes to classify the object at the determined velocity and distance. In an embodiment, the HMD 1002 may generate one or more alerts based on the classification at stage 1304. The one or more alerts may include alerting the user via display, audio or haptic sensors in the HMD 1002, as well as utilizing the MLME and a communication link to an AP as described in the method 800. In an example, referring to FIG. 12B, the HMD 1002 may generate one or more graphical objects 1210 to inform the user of attributes associated with a detected object. A velocity meter object 1212 may be used to indicate a velocity of a detected object, a distance meter object 1214 may be used to indicate a distance to the object, a size meter object 1216 may be used to indicate of size of the object. Other visual objects (e.g., icons, sliders, gauges, etc.) may also be used to inform the user of attributes associated with a detected object.

Figure 14:
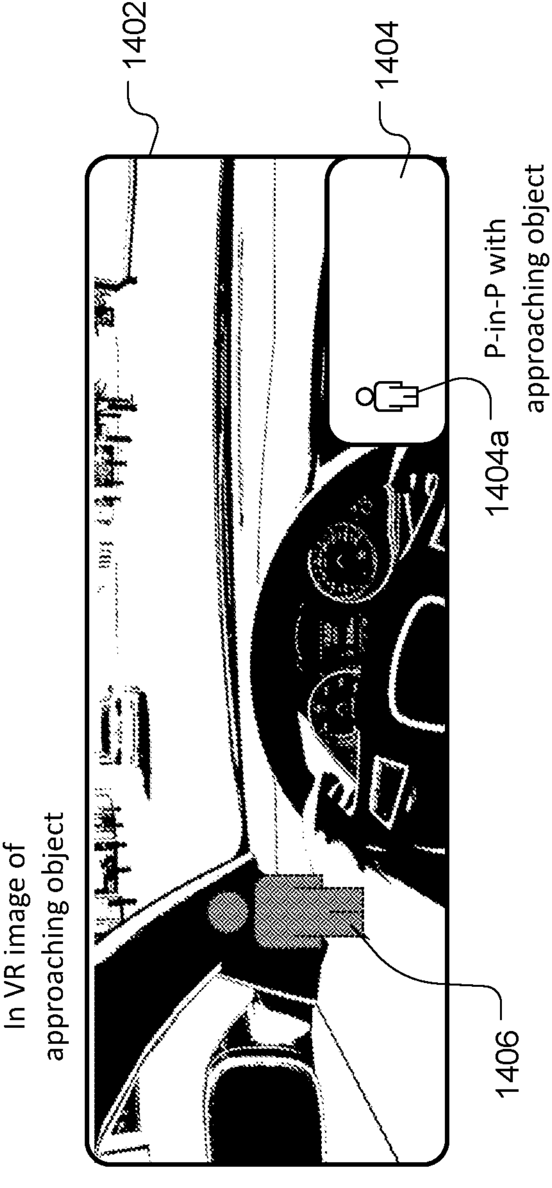
FIG. 14 is a diagram of example user alerts in a virtual reality display screen.

In an embodiment, the alert provided to the user may be camera assisted. For example, referring to FIG. 14, a VR application may be an auto racing game with a display 1402 simulating the interior of the car and the racing environment. When an alert is triggered (e.g., if one or more conditions at stages 830 or 1116 or satisfied), the HMD 1002 may be configured to present an image of the detected object obtained with the cameras 1004 on the display 1402. For example, assuming the object is an approaching child, in a first example a picture-in-picture (P-in-P) object 1404 may be included in the display 1402 to show the user an image of the child 1404*a* relative to at least one of the cameras 1004 (e.g., a forward facing camera). In a second example, an image of the child 1406 obtained by the cameras 1004 may be superimposed in the VR environment as depicted in FIG. 14. The image of the child 1406 may correspond to the relative location of the child based on the orientation of the HMD 1002 (e.g., the user's head). Other image information obtained by the camera may also be presented to the user via the display 1402.

Figure 15:
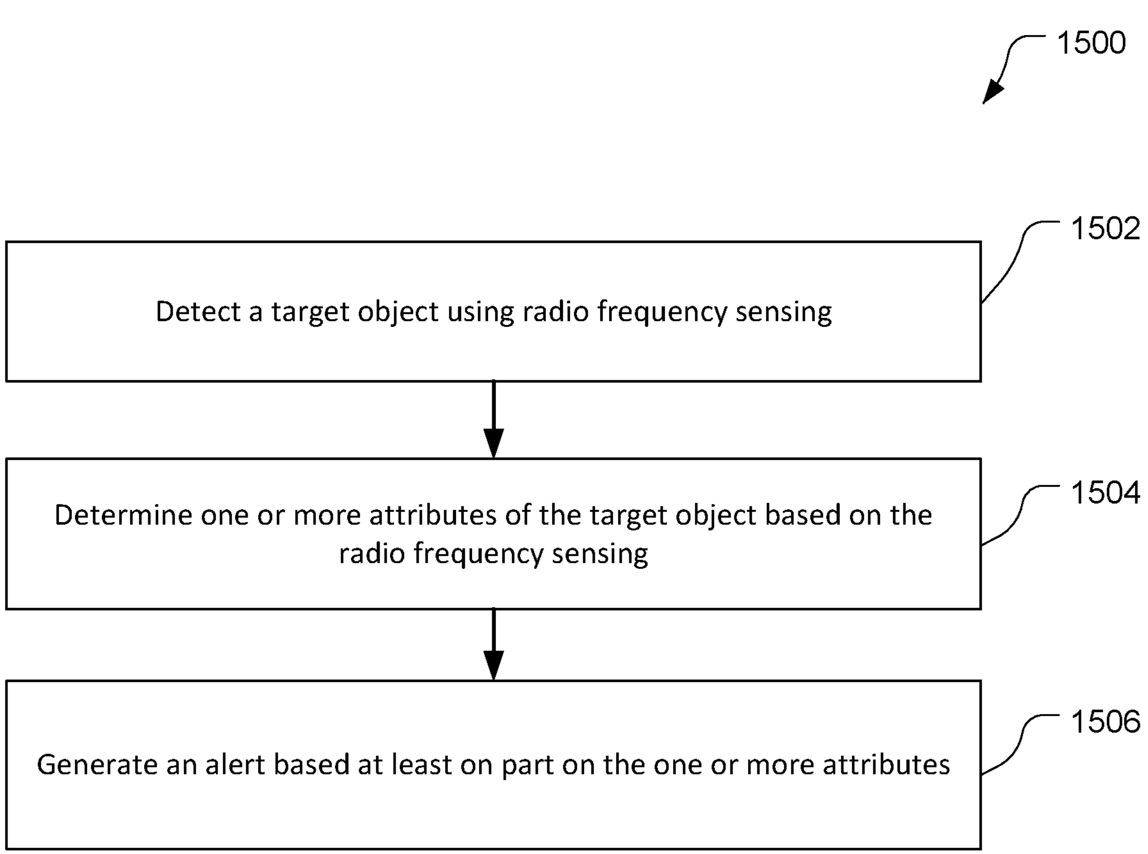
FIG. 15 is an example process flow for a method of generating a proximity alert base on an attribute of a target object.

Referring to FIG. 15, with further reference to FIGS. 1-14, a method 1500 of generating a proximity alert base on an attribute of a target object includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes detecting a target object using radio frequency sensing. A UE 200, including the transceiver 215 and the processor 230, is a means for detecting a target object. In an embodiment, the HMD 1002 may include some or all of the components of the UE 200 and may be configured to perform RF sensing as described in FIG. 4 with the communication link 1008. For example, the HMD 1002 may transmit a radio frequency signal 1008*a* towards a target object 1010. A reflected signal 1008*b* is the portion of the RF signal 1008*a* that is reflected by the target object 1010 and received by the one or more receive antennas in the HMD 1002. In an example, the HMD 1002 may include additional receive chains to enable beamforming/direction detection to enable the HMD 1002 to compute an angle of arrival (AoA) for a received signal. The receive chains may also receive a transmission leakage signal concurrently with the transmission of the RF signal 1008*a*. The transmission leakage may be conductive and/or radiated interference depending on the configuration of the HMD 1002. In an embodiment, the HMD 1002 may be a MLD configured to utilize multiple communication links including the communication link 1008.

At stage 1504, the method includes determining one or more attributes of the target object based on the radio frequency sensing. The UE 200, including the transceiver 215 and the processor 230, is a means for determining one or more attributes. In an embodiment, the RF sensing operations performed by the HMD 1002 may be configured to generate a real time velocity (V) of an object, a distance (D) to an object, and a size (S) of an object. For example, multiple distance measurements to an object may be utilized to determine the velocity (V) and/or a closure rate (e.g., the portion of the velocity vector directed toward the HMD 1002). The size (S) of the object may be based on a signal strength of the reflected signal 1008*b*. Other RF signal processing techniques may also be used to determine a velocity, distance, and size of an object. In an embodiment, the one or more attributes may include other physical and computed information associated with the target object. For example, other attributes such as bearing, elevation, CPA, ETA, may also be determined based on the RF sensing operations.

At stage 1506, the method includes generating an alert based at least in part on the one or more attributes. The UE 200, including the processor 230 and the user interface 216, is a means for generating the proximity alert. The HMD 1002 may utilize the one or more attributes associated with the target object determined at stage 1504 in one or more logical operations. The attributes may be compared against threshold values such as an approach speed threshold value V, a distance threshold value D, and a size threshold value S. In an embodiment, different alerts may be generated based on different values of the one or more attributes, such as velocity attribute, or distance attribute or both. For example, a first alert may be generated based on a first value of an attribute greater than a first threshold, and a second alert may be generated based on a second value of an attribute greater than a second threshold which is greater than the first threshold. In an embodiment, velocity and distance attributes may be used to generate different alerts based on the corresponding rate of approach. For example, a first rate of approach may indicate that the target object is moving towards the user and that the user may be in danger. The HMD 1002 may be configured to display an alert to inform the user of the possible danger based on the velocity and/or the distance to the target object. The alert may activate one or more user interface components of the user interface 216 (e.g., visual, auditory, haptic, etc.) to provide the proximity alert to the user. In an embodiment, referring to FIG. 14, the HMD 1002 may utilize the one or more cameras 1004 to display at least part of the target object in real time within the VR display 1402, or display another graphic object to alert the user of the detected object. In an example, referring to FIG. 12B, the one or more graphical objects 1210 may be associated with the attributes determined at stage 1504 and displayed to the user.

In an embodiment, the HMD 1002 may be configure to determine a classification of the target object based at least in part on an image obtained by the one or more cameras 1004, and to generate the proximity alert based at least in part on the classification of the target object. The method 1500 may include increasing the bandwidth of transmissions used for the RF sensing and/or increasing the periodicity of transmissions used for the RF sensing in response to detecting the target object. The HMD 1002 may be configured to provide an indication of the proximity alert to a network station. In an example, referring to FIG. 7, the HMD 1002 may be a MLD configured to perform RF sensing with a first frequency range (e.g., Wi-Fi 6 GHz band), and communicate with the network station such as the AP 704 via a second frequency range (e.g., Wi-Fi 5 GHz band) that is different from the first frequency range. Other combinations of the 2.4 GHz, 5 GHz, 6 GHz bands and other frequency ranges/bands/channels may also be used. The HMD 1002 may provide the indication of the proximity alert to the AP 704 via UL data frame 712*b*, or acknowledgement frame 712*c* on the first link 706, or via UL data frame 720*a* if the network station is also an MLD.

Figure 16:
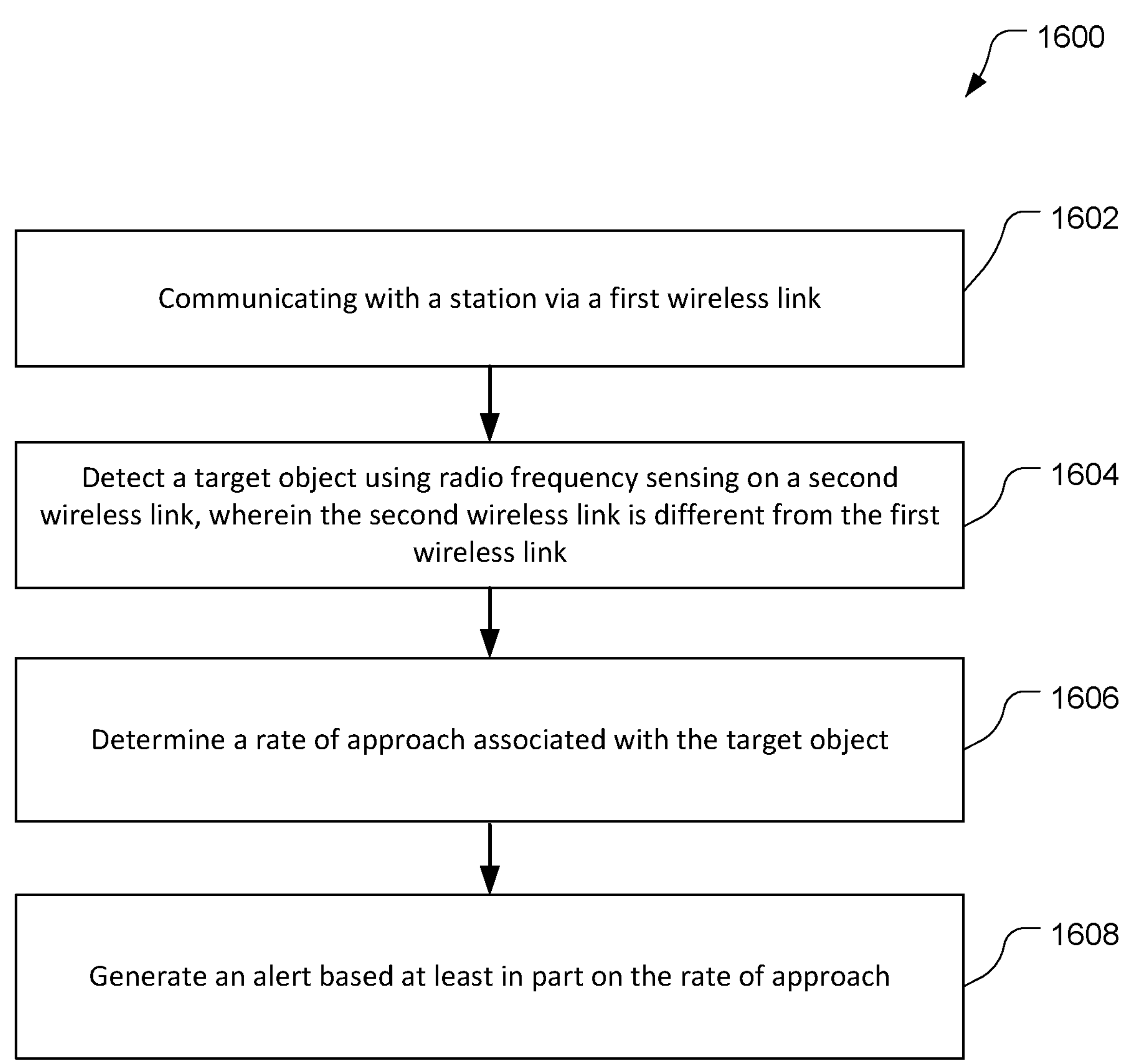
FIG. 16 is an example process flow for a method of generating an alert with a multi-link virtual reality system.

Referring to FIG. 16, with further reference to FIGS. 1-14, a method 1600 of generating an alert with a multi-link virtual reality system includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes communicating with a station via a first wireless link. A UE 200, including the transceiver 215 and the processor 230, is a means for communicating with the station via the first wireless link. The HMD 602 may include some or all of the components of the UE 200 and may be configured as a MLD. The HMD 602 may be configured to operate with the IEEE 802.11be Wi-Fi standard as an MLO on one or more frequency bands/channels such as 2.4 GHz, 5 GHz and 6 Ghz. The HMD 602 may include a plurality of transceivers to communicate (e.g., transmitting and/or receiving data) with an access point (AP) 604 via a first wireless link 608 (e.g., in the Wi-Fi 5 GHz band) while simultaneously communicating or performing RF sensing with a different second wireless link 610 (e.g., in the Wi-Fi 6 GHz band). In operation, the AP 604 may be communicatively coupled to a network server 606 and the HMD 602 and configured to send and receive data over the first wireless link 608.

At stage 1604, the method includes detecting a target object using radio frequency sensing on a second wireless link, wherein the second link is different from the first wireless link. The UE 200, including the transceiver 215 and the processor 230, is a means for detecting the target object. In an embodiment, the HMD 602 may be configured to perform RF sensing with the second wireless link 610 based on the RF sensing techniques described in FIG. 4. The second wireless link 610 may be different from the first wireless link 608 in that the first and second links may operate on different frequencies and/or in different frequency bands (e.g., 5 Ghz/6 Ghz). In an example, the HMD 602 may transmit a radio frequency signal 610*a* towards a target object 612. A reflected signal 610*b* is the portion of the RF signal 610*a* that is reflected by the target object 612 and received by the one or more receive antennas in the HMD 602. In an example, the HMD 602 may include additional receive chains to enable beamforming/direction detection to enable the HMD 602 to compute an angle of arrival (AoA) for a received signal. The receive chains may also receive a transmission leakage signal concurrently with the transmission of the RF signal 610*a*. The transmission leakage may be conductive and/or radiated interference depending on the configuration of the HMD 602.

At stage 1606, the method includes determining a rate of approach associated with the target object. The UE 200, including the transceiver 215 and the processor 230, is a means for determining the rate of approach. In an embodiment, the RF sensing operations performed by the HMD 602 may be configured to generate a real time velocity (V) of an object based on two or more range measurements. For example, multiple distance measurements to an object may be utilized to determine the velocity (V) and the rate of approach (e.g., the rate at which the target it object is getting closer to the HMD 602). In an example, to conserve power, the HMD 602 may be configured to increase the bandwidth of transmissions used for the RF sensing and/or increase the periodicity of transmissions used for the RF sensing in response to detecting the target object at stage 1604. For example, a low bandwidth (e.g., 20 MHz) may be used to generate a coarse estimate of the surrounding environment and a higher bandwidth (e.g., 160 MHz) may be used for a finer resolution of the environment. The periodicity may be relatively low (e.g., 100 ms) until a target object is detected at stage 1602, and then be increased (e.g., 10 ms or lower) to more accurately determine the rate of approach.

At stage 1608, the method includes generating an alert based at least in part on the rate of approach. The UE 200, including the transceiver 215 and the processor 230, is a means for generating an alert. In an embodiment, referring to FIG. 8, the rate of approach determined at stage 1606 may be compared to one or more threshold values to generate different alerts. In a first example, a first rate of approach may be a relatively high rate of approach indicating that the target object is moving towards the user and that the user may be in danger. The HMD 602 may provide the alert, and/or other motion information, to the AP 704 via the first link 706 so the AP 704 may stop further DL transmissions and display an alert to inform the user of the possible danger. For example, the HMD 602 may provide the indication of the proximity alert to the AP 704 via UL data frame 712*b*, or acknowledgement frame 712*c* on the first link 706, or via UL data frame 720*a* if the AP 704 is also an MLD. In an example, a second rate of approach may be a relatively lower rate indicating that the target object is moving toward the user at a slow rate and the risk of danger is less than an object at the first rate of approach. The HMD 602 may also determine if the slower moving object is within a threshold distance (e.g., 2, 3, 5 meters, etc.) to determine if an alert is necessary. If the target object is moving at the second rate of approach and is within a threshold distance, the HMD 602 may be configured to provide an alert (e.g., visual, auditory, haptic) or display other objects associated with the detected object. In an embodiment, referring to FIG. 14, the HMD 602 may utilize the camera 218 to display at least port of the target object in real time within the VR display 1402, or display another graphic object to alert the user of the detected object. In an example, referring to FIG. 12B, the one or more graphical objects 1210 may be associated with the rate of approach, or other attributes associated with the target object.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms “a,” “an,” and “the” include the plural forms as well, unless the context clearly indicates otherwise. For example, “a processor” may include one processor or multiple processors. The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is “based on” an item or condition means that the function or operation is based on the stated item or condition and may be based on one or more items and/or conditions in addition to the stated item or condition.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of “a processor configured to measure at least one of A or B” or “a processor configured to measure A or measure B” means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of “a processor configured to at least one of measure X or measure Y” means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of proximity sensing with a virtual reality headset, comprising:

communicating with a station via a first wireless link;

detecting a target object using radio frequency sensing on a second wireless link, wherein the second wireless link is different from the first wireless link;

determining a rate of approach associated with the target object; and generating an alert based at least in part on the rate of approach.

2. The method of clause 1 wherein generating the alert includes providing an indication of the alert to the station via the first wireless link.

3. The method of clause 2 wherein the indication of the alert is embedded in an uplink data frame transmitted to the station.

4. The method of clause 2 wherein the indication of the alert is included in a block acknowledgement frame transmitted to the station.

5. The method of clause 1 further comprising communicating with the station via the second wireless link.

6. The method of clause 5 wherein generating the alert includes providing an indication of the alert to the station via the second wireless link.

7. The method of clause 1 further comprising increasing a bandwidth of transmissions on the second wireless link for the radio frequency sensing in response to detecting the target object.

8. The method of clause 1 further comprising increasing a periodicity of transmissions on the second wireless link for the radio frequency sensing in response to detecting the target object.

9. The method of clause 1 further comprising determining at least one of a velocity of the target object, a size of the target object, or a distance to the target object based on the radio frequency sensing on the second wireless link.

10. The method of clause 9 wherein generating the alert comprises displaying a graphical object based on the at least one of the velocity of the target object, the size of the target object, the distance to the target object, or any combinations thereof.

11. The method of clause 9 further comprising activating a camera based on the at least one of the velocity of the target object, the size of the target object, the distance to the target object, or any combinations thereof.

12. The method of clause 10 further comprising obtaining an image with the camera and displaying at least part of the image in the virtual reality headset.

13. The method of clause 1 wherein generating the alert includes activating one or more components in the virtual reality headset.

14. The method of clause 1 wherein the radio frequency sensing is based on radio frequency sensing signals transmitted from the virtual reality headset.

15. The method of clause 1 wherein the radio frequency sensing is based on radio frequency sensing signals transmitted from the station.

16. The method of clause 1 wherein the rate of approach is based at least in part on the target object moving towards the virtual reality headset.

17. The method of clause 1 wherein the rate of approach is based at least in part on the virtual reality headset moving towards the target object.

18. The method of clause 1 wherein generating the alert includes generating different alerts corresponding to different rates of approach.

19. A method of providing an alert with a virtual reality headset, comprising:

detecting a target object using radio frequency sensing;

determining one or more attributes of the target object based on the radio frequency sensing; and generating the alert based at least in part on the one or more attributes.

20. The method of clause 19 wherein the one or more attributes include at least one of a velocity of the target object, a size of the target object, or a distance to the target object.

21. The method of clause 20 further comprising displaying a graphical object based on the at least one of the velocity of the target object, the size of the target object, the distance to the target object, or any combinations thereof.

22. The method of clause 20 further comprising activating a camera and obtaining at least one image of the target object based on at least one of the velocity of the target object, the size of the target object, the distance to the target object, or any combinations thereof.

23. The method of clause 22 further comprising displaying at least part of the at least one image in the virtual reality headset.

24. The method of clause 22 further comprising determining a classification of the target object based at least in part on the at least one image, and generating the alert based at least in part on the classification of the target object.

25. The method of clause 19 wherein the alert includes a sound, a haptic response, a displayed text, a displayed graphical object, or any combinations thereof.

26. The method of clause 19 further comprising increasing a bandwidth of transmissions used for the radio frequency sensing in response to detecting the target object.

27. The method of clause 19 further comprising increasing a periodicity of transmissions used for the radio frequency sensing in response to detecting the target object.

28. The method of clause 19 wherein generating the alert includes activating one or more components in the virtual reality headset.

29. The method of clause 19 wherein generating the alert includes providing an indication of the alert to a network station.

30. The method of clause 29 wherein the radio frequency sensing utilizes a first frequency range, and the virtual reality headset is configured to communicate with the network station via a second frequency range that is different from the first frequency range.

31. The method of clause 19 wherein the radio frequency sensing is based on radio frequency sensing signals transmitted from the virtual reality headset.

32. The method of clause 19 wherein the radio frequency sensing is based on radio frequency sensing signals transmitted from an access point.

33. The method of clause 19 wherein generating the alert includes generating different alerts corresponding to different values of the one or more attributes.

34. An apparatus, comprising:

a memory;

at least one transceiver;

at least one processor communicatively coupled to the memory and the at least one transceiver, and configured to:

communicate with a station via a first wireless link;

detect a target object using radio frequency sensing on a second wireless link, wherein the second wireless link is different than the first wireless link;

determine a rate of approach associated with the target object; and generate an alert based at least in part on the rate of approach.

35. The apparatus of clause 34 wherein the at least one processor is further configured to provide an indication of the alert to the station via the first wireless link.

36. The apparatus of clause 35 wherein the at least one processor is further configured to embed the indication of the alert in an uplink data frame transmitted to the station.

37. The apparatus of clause 35 wherein the at least one processor is further configured to embed the indication of the alert in a block acknowledgement frame transmitted to the station.

38. The apparatus of clause 34 wherein the at least one processor is further configured to communicate with the station via the second wireless link, and provide an indication of the alert to the station via the second wireless link.

39. The apparatus of clause 34 wherein the at least one processor is further configured to increase a bandwidth of transmissions on the second wireless link for the radio frequency sensing in response to detecting the target object.

40. The apparatus of clause 34 wherein the at least one processor is further configured to increase a periodicity of transmissions on the second wireless link for the radio frequency sensing in response to detecting the target object.

41. The apparatus of clause 34 wherein the at least one processor is further configured to determine a velocity of the target object, a size of the target object, a distance to the target object, or any combinations thereof, based on the radio frequency sensing on the second wireless link.

42. The apparatus clause 41 further comprising a display device communicatively coupled to the at least one processor, wherein the at least one processor is further configured to display a graphical object based on one or more of the velocity of the target object, the size of the target object, the distance to the target object, or any combinations thereof.

43. The apparatus of clause 42 further comprising at least one camera communicatively coupled to the at least one processor, wherein the at least one processor is further configured to activate the at least one camera based on at least one of the velocity of the target object, the size of the target object, the distance to the target object, or any combinations thereof.

44. The apparatus of clause 43 wherein the at least one processor is further configured to obtain an image with the at least one camera and display at least part of the image on the display device.

45. The apparatus of clause 34 further comprising one or more user interface components communicatively coupled to the at least one processor, wherein, to generate the alert, the at least one processor is further configured to activate the one or more user interface components.

46. The apparatus of clause 34 wherein the radio frequency sensing is based on radio frequency sensing signals transmitted from the apparatus.

47. The apparatus of clause 34 wherein the radio frequency sensing is based on radio frequency sensing signals transmitted from the station.

48. The apparatus of clause 34 wherein the rate of approach is based at least in part on the target object moving towards the apparatus.

49. The apparatus of clause 34 wherein the rate of approach is based at least in part on the apparatus moving towards the target object.

50. The apparatus of clause 34 wherein the at least one processor is further configured to generate different alerts corresponding to different rates of approach.

51. An apparatus, comprising:

a memory;

at least one transceiver;

at least one processor communicatively coupled to the memory and the at least one transceiver, and configured to:

detect a target object using radio frequency sensing;

determine one or more attributes of the target object based on the radio frequency sensing; and generate an alert based at least in part on the one or more attributes.

52. The apparatus of clause 51 wherein the one or more attributes include at least one of a velocity of the target object, a size of the target object, a distance to the target object, or any combination thereof.

53. The apparatus of clause 52 further comprising a display device communicatively coupled to the at least one processor, wherein the at least one processor is further configured to display a graphical object based on at least one of the velocity of the target object, the size of the target object, the distance to the target object, or any combinations thereof.

54. The apparatus of clause 53 further comprising at least one camera, wherein the at least one processor is further configured to activate the at least one camera and obtain at least one image of the target object based on at least one of the velocity of the target object, the size of the target object, the distance to the target object, or any combinations thereof.

55. The apparatus of clause 54 wherein the at least one processor is further configured to display at least part of the at least one image on the display device.

56. The apparatus of clause 54 wherein the at least one processor is further configured to determine a classification of the target object based at least in part on the at least one image, and generate the alert based at least in part on the classification of the target object.

57. The apparatus of clause 51 wherein the alert includes a sound, a haptic response, a displayed text, a displayed graphical object, or any combinations thereof.

58. The apparatus of clause 51 wherein the at least one processor is further configured to increase a bandwidth of transmissions used for the radio frequency sensing in response to detecting the target object.

59. The apparatus of clause 51 wherein the at least one processor is further configured to increase a periodicity of transmissions used for the radio frequency sensing in response to detecting the target object.

60. The apparatus of clause 51 further comprising one or more user interface components communicatively coupled to the at least one processor, wherein, to generate the alert, the at least one processor is further configured to activate the one or more user interface components.

61. The apparatus of clause 51 wherein the at least one processor is further configured to provide an indication of the alert to a network station.

62. The apparatus of clause 61 wherein the radio frequency sensing utilizes a first frequency range, and the apparatus is configured to communicate with the network station via a second frequency range that is different from the first frequency range.

63. The apparatus of clause 51 wherein the radio frequency sensing is based on radio frequency sensing signals transmitted from the apparatus.

64. The apparatus of clause 51 wherein the radio frequency sensing is based on radio frequency sensing signals transmitted from an access point.

65. The apparatus of clause 51 wherein the at least one processor is further configured to generate different alerts corresponding to different values of the one or more attributes.

66. An apparatus for proximity sensing with a virtual reality headset, comprising:

means for communicating with a station via a first wireless link;

means for detecting a target object using radio frequency sensing on a second wireless link;

means for determining a rate of approach associated with the target object; and means for generating an alert based at least in part on the rate of approach.

67. An apparatus for providing an alert with a virtual reality headset, comprising:

means for detecting a target object using radio frequency sensing;

means for determining one or more attributes of the target object based on the radio frequency sensing; and means for generating the alert based at least in part on the one or more attributes.

68. A non-transitory processor-readable storage medium comprising processor-readable instructions configured to cause one or more processors to proximity sense with a virtual reality headset, comprising:

code for communicating with a station via a first wireless link;

code for detecting a target object using radio frequency sensing on a second wireless link;

code for determining a rate of approach associated with the target object; and code for generating an alert based at least in part on the rate of approach.

69. A non-transitory processor-readable storage medium comprising processor-readable instructions configured to cause one or more processors to provide an alert with a virtual reality headset, comprising:

code for detecting a target object using radio frequency sensing;

code for determining one or more attributes of the target object based on the radio frequency sensing; and code for generating the alert based at least in part on the one or more attributes.

The invention claimed is:

1. A method of proximity sensing with a virtual reality headset, comprising:

communicating with a station external to the virtual reality headset via a first wireless link that operates in a first frequency band;

detecting a target object using radio frequency sensing on a second wireless link, wherein the second wireless link operates in a second frequency band that is different from the first frequency band;

activating at least one camera based at least in part on detecting the target object using the radio frequency sensing on the second wireless link;

determining a rate of approach associated with the target object; and generating an alert based at least in part on the rate of approach;

wherein activating the camera is based on a size of the target object exceeding a threshold size.

2. The method of claim 1 wherein generating the alert includes providing an indication of the alert to the station via the first wireless link.

3. The method of claim 2 wherein the indication of the alert is embedded in an uplink data frame transmitted to the station.

4. The method of claim 2 wherein the indication of the alert is included in a block acknowledgement frame transmitted to the station.

5. The method of claim 1 further comprising communicating with the station via the second wireless link.

6. The method of claim 5 wherein generating the alert includes providing an indication of the alert to the station via the second wireless link.

7. The method of claim 1 further comprising increasing a bandwidth of transmissions on the second wireless link for the radio frequency sensing in response to detecting the target object.

8. The method of claim 1 further comprising increasing a periodicity of transmissions on the second wireless link for the radio frequency sensing in response to detecting the target object.

9. The method of claim 1 further comprising determining at least one of a velocity of the target object, a size of the target object, or a distance to the target object based on the radio frequency sensing on the second wireless link.

10. The method of claim 9 wherein generating the alert comprises displaying a graphical object based on the at least one of the velocity of the target object, the size of the target object, the distance to the target object, or any combinations thereof.

11. The method of claim 9 further comprising activating the at least one camera based on the at least one of the velocity of the target object, the size of the target object, the distance to the target object, or any combinations thereof.

12. The method of claim 1 further comprising obtaining an image with the at least one camera and displaying at least part of the image in the virtual reality headset.

13. The method of claim 1 wherein generating the alert includes activating one or more components in the virtual reality headset.

14. The method of claim 1 wherein the radio frequency sensing is based on radio frequency sensing signals transmitted from the virtual reality headset.

15. The method of claim 1 wherein the radio frequency sensing is based on radio frequency sensing signals transmitted from the station.

16. The method of claim 1 wherein the rate of approach is based at least in part on the target object moving towards the virtual reality headset.

17. The method of claim 1 wherein the rate of approach is based at least in part on the virtual reality headset moving towards the target object.

18. The method of claim 1 wherein generating the alert includes generating different alerts corresponding to different rates of approach.

19. The method of claim 1 wherein the first wireless link is a data-only link and the second wireless link is a mixed data and sensing link.

20. The method of claim 19 wherein detecting the target object using radio frequency sensing on the second wireless link comprises transmitting radio frequency sensing signals on the second wireless link with a duty cycle of no more than 0.1.

21. A method of providing an alert with a virtual reality headset, comprising:

detecting a target object using radio frequency sensing on a wireless link;

determining one or more attributes of the target object based on the radio frequency sensing;

activating at least one camera based at least in part on detecting the target object; and generating the alert based at least in part on the one or more attributes;

wherein activating the camera is based on a size of the target object exceeding a threshold size.

22. The method of claim 21 wherein the one or more attributes include at least one of a velocity of the target object, a size of the target object, or a distance to the target object.

23. The method of claim 22 further comprising displaying a graphical object based on the at least one of the velocity of the target object, the size of the target object, the distance to the target object, or any combinations thereof.

24. The method of claim 22 further comprising obtaining at least one image of the target object based on at least one of the velocity of the target object, the size of the target object, the distance to the target object, or any combinations thereof.

25. The method of claim 24 further comprising displaying at least part of the at least one image in the virtual reality headset.

26. The method of claim 24 further comprising determining a classification of the target object based at least in part on the at least one image, and generating the alert based at least in part on the classification of the target object.

27. The method of claim 21 wherein the alert includes a sound, a haptic response, a displayed text, a displayed graphical object, or any combinations thereof.

28. The method of claim 21 further comprising increasing a bandwidth of transmissions used for the radio frequency sensing in response to detecting the target object.

29. The method of claim 21 further comprising increasing a periodicity of transmissions used for the radio frequency sensing in response to detecting the target object.

30. The method of claim 21 wherein generating the alert includes activating one or more components in the virtual reality headset.

31. The method of claim 21 wherein generating the alert includes providing an indication of the alert to a network station.

32. The method of claim 31 wherein the radio frequency sensing utilizes a first frequency range, and the virtual reality headset is configured to communicate with the network station via a second frequency range that is different from the first frequency range.

33. The method of claim 21 wherein the radio frequency sensing is based on radio frequency sensing signals transmitted from the virtual reality headset.

34. The method of claim 21 wherein the radio frequency sensing is based on radio frequency sensing signals transmitted from an access point.

35. The method of claim 21 wherein generating the alert includes generating different alerts corresponding to different values of the one or more attributes.

36. An apparatus, comprising:

a memory;

at least one camera;

at least one transceiver;

at least one processor communicatively coupled to the memory, the at least one camera, and the at least one transceiver, and configured to:

communicate with a station external to the apparatus via a first wireless link that operates in a first frequency band;

detect a target object using radio frequency sensing on a second wireless link, wherein the second wireless link operates in a second frequency band that is different than the first frequency band;

activate the at least one camera based at least in part on detecting the target object using the radio frequency sensing on the second wireless link;

determine a rate of approach associated with the target object; and generate an alert based at least in part on the rate of approach;

wherein the at least one processor is configured to activate the camera based on a size of the target object exceeding a threshold size.

37. The apparatus of claim 36 wherein the at least one processor is further configured to provide an indication of the alert to the station via the first wireless link.

38. The apparatus of claim 37 wherein the at least one processor is further configured to embed the indication of the alert in an uplink data frame transmitted to the station.

39. The apparatus of claim 37 wherein the at least one processor is further configured to embed the indication of the alert in a block acknowledgement frame transmitted to the station.

40. The apparatus of claim 36 wherein the at least one processor is further configured to communicate with the station via the second wireless link, and provide an indication of the alert to the station via the second wireless link.

41. The apparatus of claim 36 wherein the at least one processor is further configured to increase a bandwidth of transmissions on the second wireless link for the radio frequency sensing in response to detecting the target object.

42. The apparatus of claim 36 wherein the at least one processor is further configured to increase a periodicity of transmissions on the second wireless link for the radio frequency sensing in response to detecting the target object.

43. The apparatus of claim 36 wherein the at least one processor is further configured to determine a velocity of the target object, a size of the target object, a distance to the target object, or any combinations thereof, based on the radio frequency sensing on the second wireless link.

44. The apparatus claim 43 further comprising a display device communicatively coupled to the at least one processor, wherein the at least one processor is further configured to display a graphical object based on one or more of the velocity of the target object, the size of the target object, the distance to the target object, or any combinations thereof.

45. The apparatus of claim 44 wherein the at least one processor is further configured to activate the at least one camera based on at least one of the velocity of the target object, the size of the target object, the distance to the target object, or any combinations thereof.

46. The apparatus of claim 45 wherein the at least one processor is further configured to obtain an image with the at least one camera and display at least part of the image on the display device.

47. The apparatus of claim 36 further comprising one or more user interface components communicatively coupled to the at least one processor, wherein, to generate the alert, the at least one processor is further configured to activate the one or more user interface components.

48. The apparatus of claim 36 wherein the radio frequency sensing is based on radio frequency sensing signals transmitted from the apparatus.

49. The apparatus of claim 36 wherein the radio frequency sensing is based on radio frequency sensing signals transmitted from the station.

50. The apparatus of claim 36 wherein the rate of approach is based at least in part on the target object moving towards the apparatus.

51. The apparatus of claim 36 wherein the rate of approach is based at least in part on the apparatus moving towards the target object.

52. The apparatus of claim 36 wherein the at least one processor is further configured to generate different alerts corresponding to different rates of approach.

53. An apparatus, comprising:

a memory;

at least one camera;

at least one transceiver;

at least one processor communicatively coupled to the memory, the at least one camera, and the at least one transceiver, and configured to:

detect a target object using radio frequency sensing on a wireless link;

determine one or more attributes of the target object based on the radio frequency sensing;

activate the at least one camera based at least in part on detecting the target object; and generate an alert based at least in part on the one or more attributes;

wherein the at least one processor is configured to activate the camera based on a size of the target object exceeding a threshold size.

54. The apparatus of claim 53 wherein the one or more attributes include at least one of a velocity of the target object, a size of the target object, a distance to the target object, or any combination thereof.

55. The apparatus of claim 54 further comprising a display device communicatively coupled to the at least one processor, wherein the at least one processor is further configured to display a graphical object based on at least one of the velocity of the target object, the size of the target object, the distance to the target object, or any combinations thereof.

56. The apparatus of claim 55 wherein the at least one processor is further configured to obtain at least one image of the target object based on at least one of the velocity of the target object, the size of the target object, the distance to the target object, or any combinations thereof.

57. The apparatus of claim 56 wherein the at least one processor is further configured to display at least part of the at least one image on the display device.

58. The apparatus of claim 56 wherein the at least one processor is further configured to determine a classification of the target object based at least in part on the at least one image, and generate the alert based at least in part on the classification of the target object.

59. The apparatus of claim 53 wherein the alert includes a sound, a haptic response, a displayed text, a displayed graphical object, or any combinations thereof.

60. The apparatus of claim 53 wherein the at least one processor is further configured to increase a bandwidth of transmissions used for the radio frequency sensing in response to detecting the target object.

61. The apparatus of claim 53 wherein the at least one processor is further configured to increase a periodicity of transmissions used for the radio frequency sensing in response to detecting the target object.

62. The apparatus of claim 53 further comprising one or more user interface components communicatively coupled to the at least one processor, wherein, to generate the alert, the at least one processor is further configured to activate the one or more user interface components.

63. The apparatus of claim 53 wherein the at least one processor is further configured to provide an indication of the alert to a network station.

64. The apparatus of claim 63 wherein the radio frequency sensing utilizes a first frequency range, and the apparatus is configured to communicate with the network station via a second frequency range that is different from the first frequency range.

65. The apparatus of claim 53 wherein the radio frequency sensing is based on radio frequency sensing signals transmitted from the apparatus.

66. The apparatus of claim 53 wherein the radio frequency sensing is based on radio frequency sensing signals transmitted from an access point.

67. The apparatus of claim 53 wherein the at least one processor is further configured to generate different alerts corresponding to different values of the one or more attributes.

68. An apparatus for proximity sensing with a virtual reality headset, comprising:

means for communicating with a station external to the virtual reality headset via a first wireless link that operates in a first frequency band;

means for detecting a target object using radio frequency sensing on a second wireless link, wherein the second wireless link operates in a second frequency band that is different from the first frequency band;

means for activating at least one camera based at least in part on detecting the target object using the radio frequency sensing on the second wireless link;

means for determining a rate of approach associated with the target object; and means for generating an alert based at least in part on the rate of approach;

wherein the means for activating the camera are for activating the camera based on a size of the target object exceeding a threshold.

69. An apparatus for providing an alert with a virtual reality headset, comprising:

means for detecting a target object using radio frequency sensing on a wireless link;

means for determining one or more attributes of the target object based on the radio frequency sensing;

means for activating at least one camera based at least in part on detecting the target object; and means for generating the alert based at least in part on the one or more attributes;

wherein the means for activating the camera are for activating the camera based on a size of the target object exceeding a threshold.

70. A non-transitory processor-readable storage medium comprising processor-readable instructions configured to cause one or more processors to proximity sense with a virtual reality headset, comprising:

code for communicating with a station external to the virtual reality headset via a first wireless link that operates in a first frequency band;

code for detecting a target object using radio frequency sensing on a second wireless link, wherein the second wireless link operates in a second frequency band that is different from the first frequency band;

code for activating at least one camera based at least in part on detecting the target object using the radio frequency sensing on the second wireless link;

code for determining a rate of approach associated with the target object; and code for generating an alert based at least in part on the rate of approach;

wherein the code for activating the camera comprise code for activating the camera based on a size of the target object exceeding a threshold size.

71. A non-transitory processor-readable storage medium comprising processor-readable instructions configured to cause one or more processors to provide an alert with a virtual reality headset, comprising:

code for detecting a target object using radio frequency sensing on a wireless link;

code for determining one or more attributes of the target object based on the radio frequency sensing;

code for activating at least one camera based at least in part on detecting the target object; and code for generating the alert based at least in part on the one or more attributes;

wherein the code for activating the camera comprise code for activating the camera based on a size of the target object exceeding a threshold size.

* * * * *